US011865978B2

(12) United States Patent
Heafitz et al.

(10) Patent No.: US 11,865,978 B2
(45) Date of Patent: Jan. 9, 2024

(54) OBJECT TRACKING SYSTEM INCLUDING STEREO CAMERA ASSEMBLY AND METHODS OF USE

(71) Applicant: Aurora Flight Sciences Corporation, a subsidiary of The Boeing Company, Manassas, VA (US)

(72) Inventors: Andrew Mark Heafitz, Cambridge, MA (US); Igor Janjic, Newport News, VA (US)

(73) Assignee: Aurora Flight Sciences Corporation, a Subsidiary of the Boeing Company, Manassas, VA (US)

( * ) Notice: Subject to any disclaimer, the term of this patent is extended or adjusted under 35 U.S.C. 154(b) by 0 days.

(21) Appl. No.: 17/454,446

(22) Filed: Nov. 10, 2021

(65) Prior Publication Data

US 2022/0144186 A1    May 12, 2022

Related U.S. Application Data

(60) Provisional application No. 63/112,466, filed on Nov. 11, 2020.

(51) Int. Cl.
*G02B 13/06* (2006.01)
*B60R 11/04* (2006.01)
*G03B 35/18* (2021.01)

(52) U.S. Cl.
CPC .............. *B60R 11/04* (2013.01); *G02B 13/06* (2013.01); *G03B 35/18* (2013.01); *B60R 2300/107* (2013.01)

(58) Field of Classification Search
CPC .......... B60R 11/04; G02B 13/06; G03B 35/18
USPC ......................................................... 348/148
See application file for complete search history.

(56) References Cited

U.S. PATENT DOCUMENTS

| | | | |
|---|---|---|---|
| 2013/0243258 | A1 | 9/2013 | Hennessey et al. |
| 2017/0008521 | A1 | 1/2017 | Braunstein et al. |
| 2018/0114325 | A1 | 4/2018 | Sanders |
| 2019/0225168 | A1* | 7/2019 | Nakamura ............ H04L 67/12 |
| 2021/0150279 | A1 | 5/2021 | Dudkiz et al. |
| 2021/0295530 | A1 | 9/2021 | Janjic et al. |

FOREIGN PATENT DOCUMENTS

CN          110866480 A          3/2020

OTHER PUBLICATIONS

CN110866480 Machine Translation (Year: 2020).*
Extended European Search Report dated Mar. 18, 2022 regarding EP Application No. 201200114.3; 9 pages.
Cipolla et al., "Stereoscopic Tracking of Bodies in Motion," Proceedings of the Alvey Vision Conference, 1989, pp. 109-114.

* cited by examiner

*Primary Examiner* — Nguyen T Truong
(74) *Attorney, Agent, or Firm* — Yee & Associates, P.C.

(57) ABSTRACT

An example of the present disclosure provides a stereo camera assembly of an object tracking system. The stereo camera assembly comprises a wide-angle lens camera mounted on a mounting structure and a telephoto lens camera mounted on the mounting structure such that a field of view of the telephoto lens camera is at least partially encompassed by a field of view of the wide-angle lens camera.

21 Claims, 13 Drawing Sheets

OBJECT TRACKING SYSTEM INCLUDING STEREO CAMERA ASSEMBLY AND METHODS OF USE

CROSS-REFERENCE TO RELATED APPLICATION

This application claims the benefit of U.S. Provisional Patent Application Ser. No. 63/112,466, filed Nov. 11, 2020, and entitled "Object Tracking System Including Stereo Camera Assembly and Methods of Use"; which is incorporated herein by reference in its entirety.

BACKGROUND INFORMATION

1. Field

The present disclosure relates generally to an improved sensor system and, in particular, to tracking moving objects with a sensor system. Still more particularly, the present disclosure provides a method and improved stereo camera assembly for object tracking.

2. Background

The movement of objects can be tracked in a sequence of images over time. Image analysis techniques can be employed to detect motion of an object in the sequence of images.

Further, the movement of objects through space can also be tracked using images. For example, stereoscopic tracking of objects can be performed to identify a location of the objects in three-dimensional space. Current stereoscopic techniques, however, may be undesirably expensive or unable to track objects in a large area.

Therefore, it would be desirable to have a method and apparatus that take into account at least some of the issues discussed above, as well as other possible issues. For example, it would be desirable to have a method and apparatus that could increase an area for tracking objects with a desired level accuracy without undesirably increasing cost.

SUMMARY

An example of the present disclosure provides a stereo camera assembly of an object tracking system. The stereo camera assembly comprises a wide-angle lens camera mounted on a mounting structure and a telephoto lens camera mounted on the mounting structure such that a field of view of the telephoto lens camera is at least partially encompassed by a field of view of the wide-angle lens camera.

Another example of the present disclosure provides a method. The method comprises receiving, by a computer system, a wide-angle image and a telephoto image, wherein the wide-angle image is provided by a wide-angle lens camera of a stereo camera assembly and the telephoto image is provided by a telephoto lens camera of the stereo camera assembly. The telephoto lens camera is mounted on a mounting structure such that a field of view of the telephoto lens camera is at least partially encompassed by a field of view of the wide-angle lens camera. A transformation is performed by the computer system on the wide-angle image and the telephoto image to map the telephoto image to the wide-angle image.

Yet another example of the present disclosure provides an object tracking system. An object tracking system comprises a wide-angle lens camera mounted on a mounting structure, a telephoto lens camera mounted on the mounting structure such that a field of view of the telephoto lens camera is at least partially encompassed by a field of view of the wide-angle lens camera, a computer system, and a movement system. The computer system is configured to receive a wide-angle image from the wide-angle lens camera, receive a telephoto image from the telephoto lens camera, determine whether an object is identifiably present within the wide-angle image, determine whether the object is identifiably present within the telephoto image, generate commands to move the mounting structure in response to determining the object is identifiably present in only one of the telephoto image or the wide-angle image. The movement system is configured to move the mounting structure in response to receiving commands from the computer system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
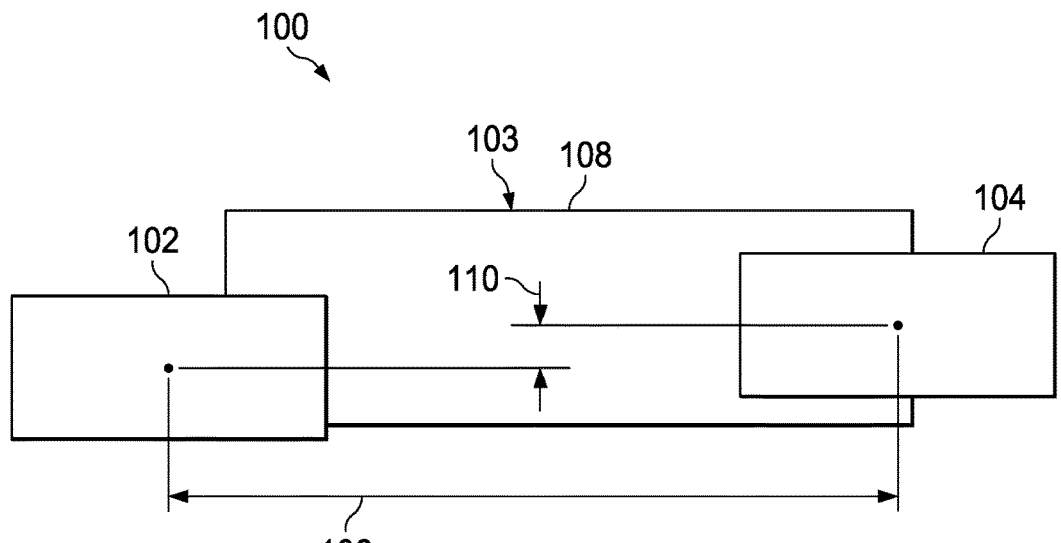
FIG. 1 is an illustration of a stereoscopic imaging system in accordance with an illustrative embodiment.

The illustrative embodiments recognize and take into account one or more different considerations. For example, the illustrative embodiments recognize and take into account that a platform, such as a micro aerial vehicle, can carry a stereoscopic imaging system. The images generated from this imaging system can be analyzed to track movement of an object such as another micro aerial vehicle.

The illustrative embodiments recognize and take into account that one manner in which an object can be tracked is through the use of an artificial intelligence system comprising artificial neural networks. The illustrative embodiments also recognize and take into account that object tracking can be performed using image masking and intensity averaging within the masked images. When using masking and intensity averaging, a three-dimensional position of the object is determined using a set of common pixels in subsequent masked images. As used herein, a "set of," when used with reference to items, means one or more items. For example, a "set of pixels" is one or more pixels.

The illustrative examples recognize and take into account that stereoscopic vision utilizes two cameras. In stereo imaging an object is identified in two images to determine depth, location in three-dimensional space. Typically, the same type of camera is used for both cameras in a stereo vision system.

The illustrative examples recognize and take into account that when an object is too far from the stereoscopic imaging system, sufficient data may not be identifiable in the two images to locate an object. In these examples, the object may be present in the image but not identifiable, so that the object is not identifiably present. The illustrative examples recognize and take into account that when an object is too far from the stereoscopic imaging system, sufficient data may not be present in the two images to perform triangulation.

The illustrative examples recognize and take into account that to increase a distance from the stereoscopic vision system at which objects can be identified, higher resolution cameras may be used. The illustrative examples recognize and take into account that using higher resolution cameras with a greater quantity of pixels is more expensive. The illustrative examples also recognize and take into account that additional computer processing resources are required for analyzing images having higher pixel counts. Higher magnification cameras may have a smaller field of view. The illustrative examples recognize and take into account that if an object exits a field of view, it may be undesirably difficult to re-acquire a view of the object.

The illustrative examples recognize and take into account that it would be desirable to provide a stereoscopic imaging system that can track an object in a larger area than an area in which conventional stereoscopic imaging systems can track an object. The illustrative examples recognize and take into account that it would be desirable to provide a stereoscopic imaging system that does not undesirably increase the cost of the object tracking system. The illustrative examples recognize and take into account that it would be desirable to provide a stereoscopic imaging system that does not undesirably increase the utilized processing resources of the object tracking system.

The illustrative example provides a stereo camera assembly of an object tracking system. The stereo camera assembly comprises a wide-angle lens camera mounted on a mounting structure and a telephoto lens camera mounted on the mounting structure such that a field of view of the telephoto lens camera is at least partially encompassed by a field of view of the wide-angle lens camera. The use of two different types of lenses allows for object identification in a larger area than an area in which conventional stereoscopic imaging systems can identify an object. The wide-angle lens camera expands a horizontal width of a field of view and the telephoto lens camera provides an ability to identify an object from a greater distance than the wide-angle lens camera.

The use of two different types of lenses provides for moving the stereo camera assembly relative to the object to enable object tracking. In some illustrative examples, moving the stereo camera assembly can include movement of the camera assembly using pan, tilt, or zoom. In some illustrative examples, moving the stereo camera assembly includes moving a platform on which the stereo camera assembly is mounted. By moving the stereo camera assembly, the field of view of the stereo camera assembly is changed. In some illustrative examples, the field of view of the stereo camera assembly is changed to track the object.

With reference now to the figures, and specifically to FIG. 1, an illustration of a stereoscopic imaging system is depicted in accordance with an illustrative embodiment. Stereoscopic imaging system 100 is a simplified illustration of a physical implementation of stereoscopic imaging system 100 of FIG. 1. Stereoscopic imaging system 100 is an example of a stereoscopic imaging system that can be used to generate stereoscopic images 200 of FIG. 2. In some illustrative examples, stereoscopic imaging system 100 is an example of stereoscopic imaging system 306 of FIGS. 3-5. In some illustrative examples, stereoscopic imaging system 100 is an example of stereoscopic imaging system payload 706 of FIG. 7. Stereoscopic imaging system 100 is an example of a stereoscopic imaging system that can be used in performing flowchart 600 of FIG. 6 or any of the processes shown in any of FIGS. 8-11. Stereoscopic imaging system 100 is a physical implementation of stereoscopic imaging system 1210 of FIGS. 12 and 15.

Stereoscopic imaging system 100 comprises wide-angle lens camera 102 mounted on mounting structure 103 and telephoto lens camera 104 mounted on mounting structure 103. Wide-angle lens camera 102 comprises a wide-angle lens and a sensor. Telephoto lens camera 104 comprises a telephoto lens and a sensor. Telephoto lens camera 104 is mounted on mounting structure 103 such that a field of view of telephoto lens camera 104 is at least partially encompassed by a field of view of wide-angle lens camera 102. In some illustrative examples, telephoto lens camera 104 is mounted on mounting structure 103 such that a field of view of telephoto lens camera 104 is completely encompassed by a field of view of wide-angle lens camera 102.

Mounting characteristics include a respective height for mounting each of wide-angle lens camera 102 and telephoto lens camera 104 on mounting structure 103, a set distance between wide-angle lens camera 102 and telephoto lens camera 104, and a mounting angle for each of wide-angle lens camera 102 and telephoto lens camera 104. Each of the mounting characteristics affect the relative positions of the field of view of wide-angle lens camera 102 and the field of view of telephoto lens camera 104.

As depicted, wide-angle lens camera 102 and telephoto lens camera 104 are set distance 106 apart. Set distance 106 is determined to desirably provide stereoscopic information. In some illustrative examples, increasing set distance 106 can increase stereoscopic information. Set distance 106 is used in performing image analysis to map the telephoto image to the wide-angle image.

Mounting structure 103 takes any desirable form. As depicted, mounting structure 103 takes the form of frame 108. In some illustrative examples, mounting structure 103 is configured to be connected to a vehicle. In other non-depicted examples, mounting structure 103 is a component of a platform.

As depicted, wide-angle lens camera 102 and telephoto lens camera 104 are mounted at different heights. In this illustrative example, wide-angle lens camera 102 and telephoto lens camera 104 are mounted with difference 110 in height. However, in other illustrative examples, wide-angle lens camera 102 and telephoto lens camera 104 can be mounted at the same height. Difference 110 can be used in performing image analysis to map the telephoto image to the wide-angle image.

As depicted, wide-angle lens camera 102 and telephoto lens camera 104 are mounted at a same angle relative to frame 108. In this illustrative example, wide-angle lens camera 102 and telephoto lens camera 104 are mounted such that wide-angle lens camera 102 and telephoto lens camera 104 are facing out of the page in FIG. 1. In this illustrative example, both wide-angle lens camera 102 and telephoto lens camera 104 are mounted on mounting structure 103 perpendicular to mounting structure 103. The relative angles of wide-angle lens camera 102 and telephoto lens camera 104 are used in image analysis to map the telephoto image to the wide-angle image.

The relative positions of wide-angle lens camera 102 and telephoto lens camera 104, including set distance 106, difference 110 in height, and the angles of each of wide-angle lens camera 102 and telephoto lens camera 104 are utilized in image analysis of images captured by wide-angle lens camera 102 and telephoto lens camera 104. For example, the relative positions of wide-angle lens camera 102 and telephoto lens camera 104 are used in performing a transformation on a wide-angle image and a telephoto image to map the telephoto image to the wide-angle image. The transformation is an image processing logic to overlap the images taken from wide-angle lens camera 102 and telephoto lens camera 104.

Stereoscopic imaging system 100 provides stereoscopic images for object tracking. Additionally, stereoscopic images generated by stereoscopic imaging system 100 can be used to reposition stereoscopic imaging system 100 to provide for object tracking. Stereoscopic imaging system 100 increases the area that can be monitored for object tracking compared to a conventional stereoscopic imaging system without undesirably increasing the cost of the object tracking system. Stereoscopic imaging system 100 increases the area that can be monitored for object tracking compared to a conventional stereoscopic imaging system without undesirably increasing the processing resources used by the object tracking system.

Figure 2:
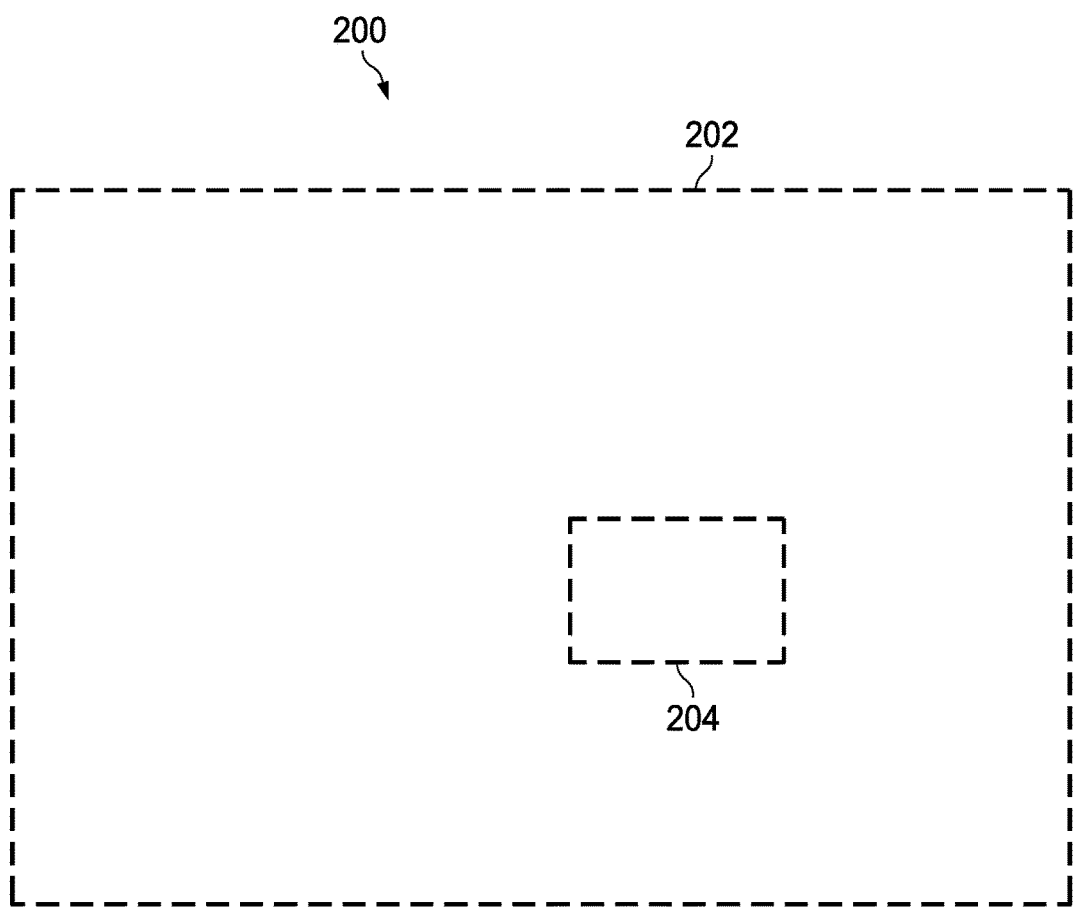
FIG. 2 is an illustration of stereoscopic images produced by a wide-angle lens camera and a telephoto lens camera in accordance with an illustrative embodiment.

Turning now to FIG. 2, an illustration of stereoscopic images produced by a wide-angle lens camera and a telephoto lens camera is depicted in accordance with an illustrative embodiment. Stereoscopic images 200 are depicted to illustrate the relative positions of the field-of-view of a wide-angle lens camera and a field-of-view of a telephoto lens camera. Stereoscopic images 200 include wide-angle image 202 and telephoto image 204. Wide-angle image 202 is captured by a wide-angle lens camera, such as wide-angle lens camera 102 of FIG. 1, wide-angle lens camera 308 of FIGS. 3-5, or wide-angle lens camera 1222 of FIG. 12. Telephoto image 204 is captured by a telephoto lens camera, such as telephoto lens camera 104 of FIG. 1, telephoto lens camera 310 of FIGS. 3-5, or telephoto lens camera 1224 of FIG. 12.

As can be seen in FIG. 2, the field of view of telephoto image 204 is completely encompassed by a field of view of wide-angle image 202. In other non-illustrative examples, the field of view of a telephoto image can be only partially encompassed by a field of view of wide-angle image 202.

The field of view of telephoto image 204 corresponds to the field of view of the telephoto lens camera at the time of capturing telephoto image 204. The field of view of wide-angle image 202 corresponds to the field of view of the wide-angle lens camera at the time of capturing wide-angle image 202. Telephoto image 204 and wide-angle image 202 are captured at substantially the same time. The positioning of the field of view of telephoto image 204 within the field of view of wide-angle image 202 is affected by the positioning of the telephoto lens camera and wide-angle lens camera. Changing any of the heights, angles, or set distance between the wide-angle lens camera and telephoto lens camera will change the relative locations of the fields of view. Because telephoto image 204 and wide-angle image 202 are captured by two different types of lenses, a one-to-one correlation of pixels cannot be done. To map telephoto image 204 to wide-angle image 202, a transformation is performed on wide-angle image 202 and/or telephoto image 204. The transformation is an image processing logic to overlap wide-angle image 202 and telephoto image 204.

Figure 3:
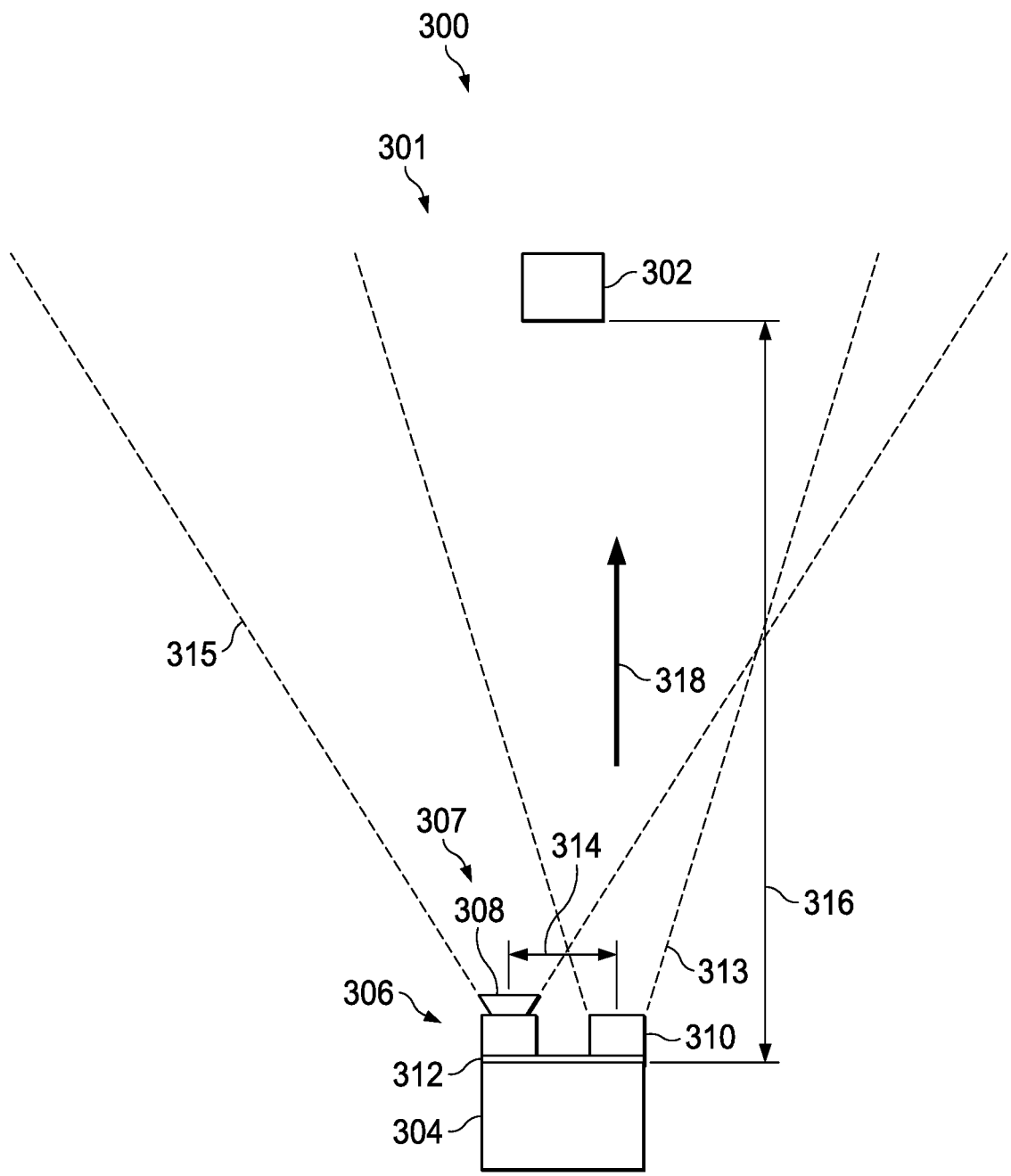
FIG. 3 is an illustration of a stereoscopic imaging system and an object in a tracking environment in accordance with an illustrative embodiment.

Turning now to FIG. 3, an illustration of a stereoscopic imaging system and an object in a tracking environment is depicted in accordance with an illustrative embodiment. Tracking environment 300 is an example depiction of tracking environment 1200 of FIG. 12. Object 302 and platform 304 are present in tracking environment 300. Stereoscopic imaging system 306 of stereo camera assembly 307 is connected to platform 304. Stereo camera assembly 307 comprises wide-angle lens camera 308 and telephoto lens camera 310.

Wide-angle lens camera 308 comprises a wide-angle lens and an image sensor. Telephoto lens camera 310 comprises a telephoto lens and an image sensor.

Wide-angle lens camera 308 is mounted on mounting structure 312. Telephoto lens camera 310 is mounted on mounting structure 312. Telephoto lens camera 310 is mounted on mounting structure 312 such that field of view 313 of telephoto lens camera 310 is at least partially encompassed by field of view 315 of wide-angle lens camera 308. In some illustrative examples, telephoto lens camera 310 is mounted on mounting structure 312 a set distance, distance 314, away from wide-angle lens camera 308 such that a field of view of telephoto lens camera 310 is completely encompassed by a field of view of wide-angle lens camera 308. In some illustrative examples, mounting structure 312 is configured to be connected to platform 304. In some illustrative examples, mounting structure 312 is a component of platform 304.

Platform 304 can take a number of different forms. For example, platform 304 can be one of an aircraft, an airplane, a rotorcraft, an unmanned aerial vehicle, a micro aerial vehicle, a ship, a train, a rocket, a spacecraft, a satellite, a stationary platform, a moving platform, an aquatic platform, a space platform, a building, or other suitable types of platforms.

In view 301 object 302 is distance 316 from stereo camera assembly 307. In this illustrative example, distance 316 is too great for object 302 to be identified in a wide-angle image from wide-angle lens camera 308. Although object 302 can be present in the wide-angle image, it is not identifiable in the wide-angle image. For example, a representation of object 302 in the wide-angle image may be too few pixels to be identified.

Object 302 is identifiable in an image when sufficient pixels are present to determine that the same object, object 302, is in both a wide-angle image and a telephoto image. In some illustrative examples, object 302 can be identifiable without having sufficient pixels to distinguish object 302 from objects of a like type. In some illustrative examples, object 302 may be identifiable as the same aircraft in both a wide-angle image and a telephoto image based on the location in the pair of images and the pixels in both images. In some of these illustrative examples, object 302 is not distinguishable from other aircraft of a same body type in the pair of images despite being identifiable in both images. In some illustrative examples, object 302 can be identifiable, using either the wide-angle lens camera 308, the telephoto lens camera 310, or both, when sufficient pixels are present to identify certain visual characteristics or features of an object type. Visual characteristics or features, such as color, shape, dimension, can be used to identify a type of the object.

Distance 316 is such that object 302 is present and identifiable in the telephoto image from telephoto lens camera 310. When object 302 is both present and identifiable in an image, object 302 is identifiably present in the image.

In some illustrative examples, it is desirable for platform 304 to stay a minimum distance away from object 302. When a minimum distance is desirable, the minimum distance is situation dependent. For example, it may be desirable for platform 304 to stay a minimum distance away from object 302 to prevent collision. The minimum distance can be set to accomplish any desirable goal or based on any guidance such as user preference, manufacturer specifications, or other guidance. In some of these illustrative examples, when object 302 is identifiably present in the telephoto image but not the wide-angle image, platform 304 is determined to be at least the minimum distance away from object 302. In some of these illustrative examples, when object 302 is identifiably present in the telephoto image but not the wide-angle image, no further action is taken.

In some illustrative examples, when object 302 is identifiably present in the telephoto image but not the wide-angle image, it may be desirable to move the stereo camera assembly 307 closer to object 302. It may be desirable to move the stereo camera assembly 307 closer to object 302 for object tracking, maintaining a set maximum distance from object 302, or other desirable reasons. For example, when it is desirable to obtain stereoscopic information for object 302, stereo camera assembly 307 is desirably moved in direction 318 towards object 302. When object tracking of the object is desired but object 302 is only identifiably present in the telephoto image from telephoto lens camera 310, stereo camera assembly 307 may be desirably moved in direction 318 towards object 302.

In this illustrative example, stereo camera assembly 307 is desirably moved in direction 318 towards object 302. In some illustrative examples, stereo camera assembly 307 is moved using a movement system of stereo camera assembly 307 such that stereo camera assembly 307 is moved independently of platform 304. In some illustrative examples, a movement system of platform 304 is used to move stereo camera assembly 307 in direction 318 with platform 304. In some illustrative examples, platform 304 is a vehicle and stereo camera assembly 307 is moved in direction 318 by a movement system of the vehicle. When object 302 is identifiably present in the telephoto image but not identifiably present in the wide-angle image, the location of object 302 in the telephoto image is used to determine direction 318.

Figure 4:
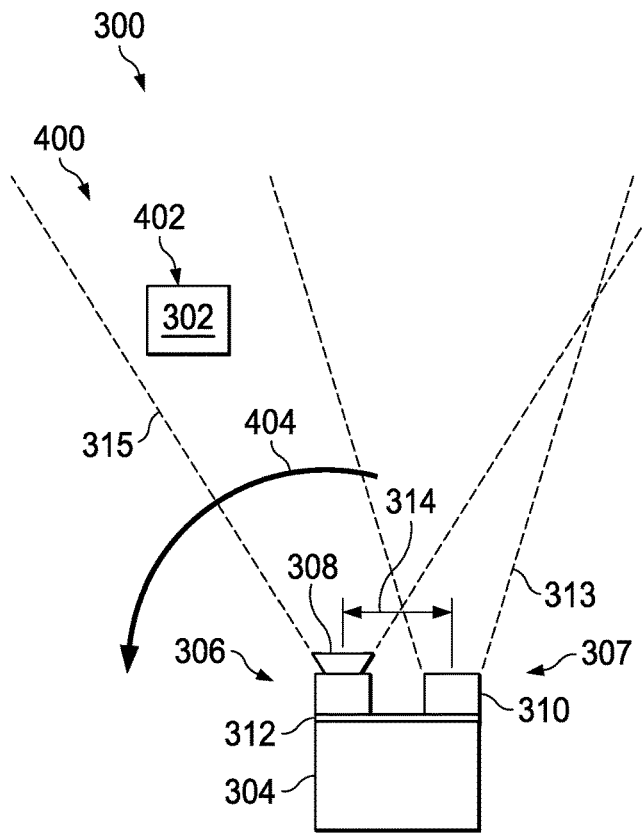
FIG. 4 is an illustration of a stereoscopic imaging system and an object in a tracking environment in accordance with an illustrative embodiment.

Turning now to FIG. 4, an illustration of a stereoscopic imaging system and an object in a tracking environment is depicted in accordance with an illustrative embodiment. View 400 is a view in which object 302 is at position 402. When object 302 is at position 402, object 302 is within field of view 315 of wide-angle lens camera 308 and is identifiably present in a wide-angle image from wide-angle lens camera 308. Object 302 at position 402 is not within field of view 313 of telephoto lens camera 310 and is not identifiably present in a telephoto image from telephoto lens camera 310.

When object 302 is identifiably present in a wide-angle image but not a telephoto image, stereo camera assembly 307 is rotated towards object 302. The rotation can be about any desirable axis. For example, the rotation of stereo camera assembly 307 can be about at least one of a pitch axis, a roll axis, or a yaw axis. In view 400, stereo camera assembly 307 is rotated towards object 302 by moving stereo camera assembly 307 in direction 404.

In some illustrative examples, stereo camera assembly 307 is rotated towards object 302 by moving stereo camera assembly 307 using a movement system of stereo camera assembly 307. When stereo camera assembly 307 is moved using a movement system of stereo camera assembly 307, stereo camera assembly 307 is moved independently of platform 304. In some illustrative examples, a movement system of platform 304 is used to move stereo camera assembly 307 in direction 404 with platform 304. In some illustrative examples, platform 304 is a vehicle and stereo camera assembly 307 is moved in direction 404 by a movement system of the vehicle. When object 302 is identifiably present in a wide-angle image but not a telephoto image, the location of object 302 in the wide-angle image is used to determine direction 404.

Figure 5:
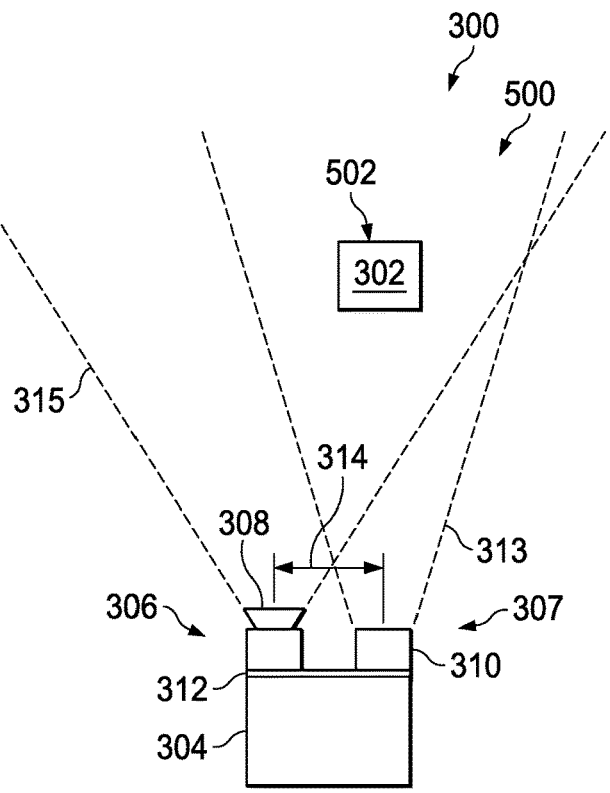
FIG. 5 is an illustration of a stereoscopic imaging system and an object in a tracking environment in accordance with an illustrative embodiment.

Turning now to FIG. 5, an illustration of a stereoscopic imaging system and an object in a tracking environment is depicted in accordance with an illustrative embodiment. View 500 is a view in which object 302 is at position 502.

When object 302 is at position 502, object 302 is within field of view 313 of telephoto lens camera 310 and is identifiably present in telephoto image captured by telephoto lens camera 310. When object 302 is at position 502, object 302 is also within field of view 315 of wide-angle lens camera 308 and is identifiably present a wide-angle image captured by wide-angle lens camera 308. When object 302 is identifiably present in both a telephoto image and a wide-angle image, stereoscopic information used to calculate a three-dimensional coordinate of object 302 can be determined from the telephoto image and the wide-angle image. When object 302 is identifiably present in both a telephoto image and a wide-angle image, such as when object is at position 502, object tracking can be performed using the telephoto image and wide-angle image from stereo camera assembly 307.

Object tracking of object 302 can be performed using any desirable method. In some illustrative examples, object tracking of object 302 is performed using process 900 of FIG. 9. In some illustrative examples, object tracking of object 302 is performed using process 1100 of FIG. 11. In some illustrative examples, object tracking of object 302 is performed using object tracking system 1204 of FIG. 12. In some illustrative examples, object tracking of object 302 is performed using object tracking system 1204 of FIG. 15. In some illustrative examples, object tracking of object 302 is performed using tracking state machine 1400 of FIG. 14.

Figure 6:
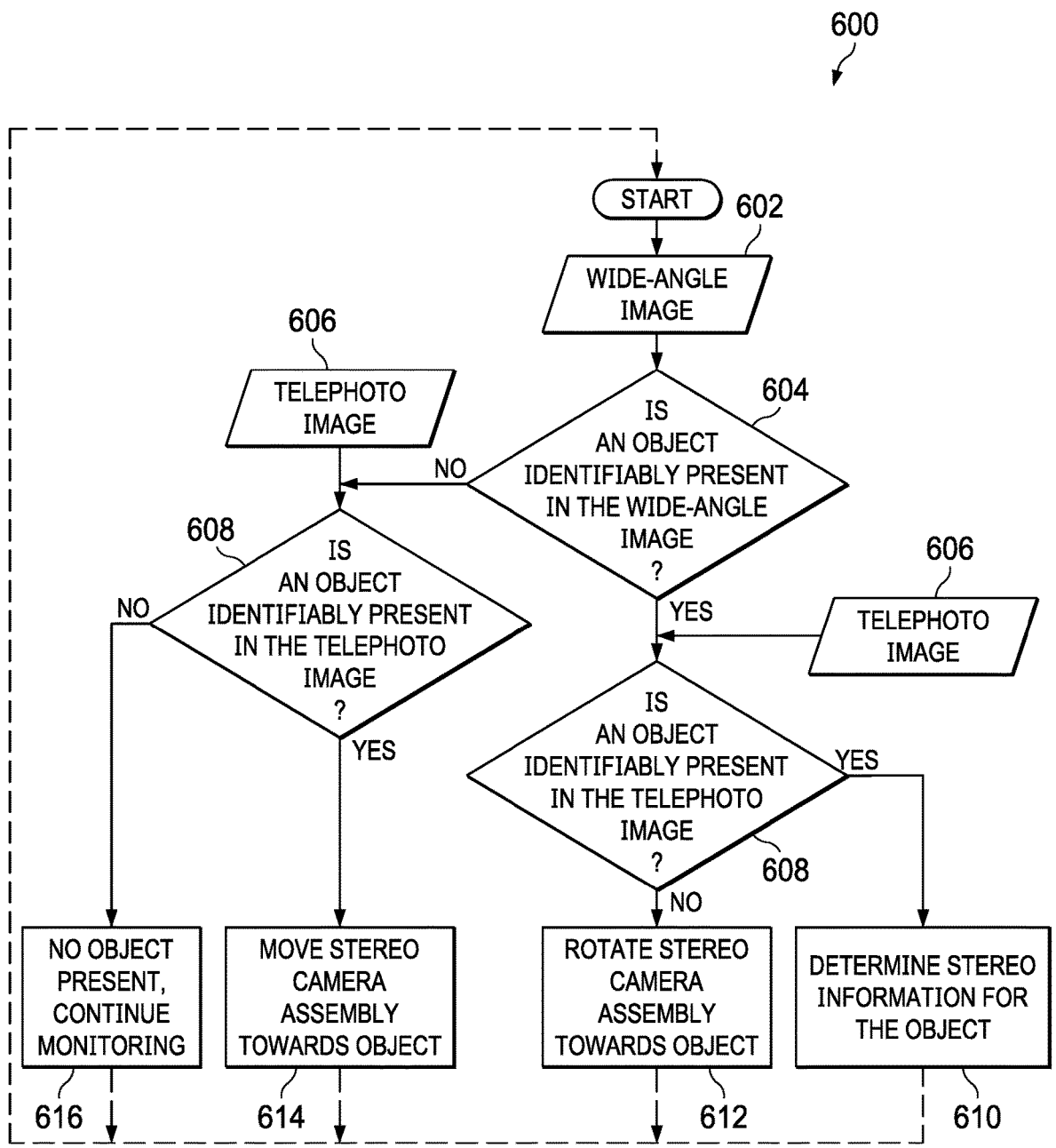
FIG. 6 is an illustration of a flowchart of actions based on wide-angle image and a telephoto image in accordance with an illustrative embodiment.

Turning now to FIG. 6, an illustration of a flowchart of actions based on wide-angle image and a telephoto image is depicted in accordance with an illustrative embodiment. Flowchart 600 can be implemented by stereo camera assembly 1203 of FIG. 12. Flowchart 600 can utilize stereoscopic images 200 of FIG. 2. Flowchart 600 can be implemented using stereo camera assembly 307 of FIGS. 3-5 and can utilize stereoscopic images from stereoscopic imaging system 306 of FIGS. 3-5. Flowchart 600 can be implemented in tracking environment 700 using stereoscopic imaging system payload 706 of FIG. 7. Flowchart 600 can be implemented in object tracking system 1204 including object tracker 1208 in computer system 1206 of FIGS. 12 and 15. Portions of flowchart 600 can be implemented in data processing system 1600 of FIG. 16.

A wide-angle image is received in operation 602. The wide-angle image is received by a computer system of a stereo camera assembly. In operation 604, a determination is made as to whether an object is identifiably present in the wide-angle image. The determination is made by the computer system. An object can be present in an image but not sizeable enough to be identified. When an object is identifiably present, the object is both present and identifiable in the image.

A telephoto image is received in operation 606. The telephoto image is received by the computer system. In operation 608, a determination is made as to whether the object is identifiably present in the telephoto image. The identifiable presence of the object in one or more of the wide-angle image or the telephoto image indicates a position of the object relative to the stereo camera assembly creating the wide-angle image and the telephoto image.

When an object is determined to be identifiably present in operation 604, it is determined whether the same object is identifiably present in the telephoto image in operation 608. When an object is determined to be identifiably present in the wide-angle image in operation 604 and is determined to be identifiably present in the telephoto image in operation 608, stereo information is determined for the object in operation 610. The stereo information includes information to determine a three-dimensional position of the object. Operation 610 is performed when operation 604 and operation 608 result in identifying the same object in both the wide-angle image and the telephoto image.

Stereo information for the object can be used to determine a three-dimensional position of the object. When an object is determined to be identifiably present in the wide-angle image in operation 604 and is determined to be identifiably present in the telephoto image in operation 608, object tracking can be performed using the wide-angle image and the telephoto image.

When an object is determined to be identifiably present in the wide-angle image in operation 604 and is determined to not be identifiably present in the telephoto image in operation 608, the object is outside the field of view of the telephoto lens camera. When an object is determined to be identifiably present in the wide-angle image in operation 604 and is determined to not be identifiably present in the telephoto image in operation 608, the stereo camera assembly is rotated towards the object in operation 612. The rotation can be about any desirable axis. For example, the rotation of the stereo camera assembly can be about at least one of a pitch axis, a roll axis, or a yaw axis.

In some illustrative examples the stereo camera assembly is mounted on a platform and the stereo camera assembly has a movement system that pivots the stereo camera assembly independently of the platform. In some illustrative examples the stereo camera assembly is mounted on a platform and the stereo camera assembly is rotated by moving the platform using a movement system of the platform.

If an object is not identifiably present in the wide-angle image in operation 604, it is determined whether an object is identifiably present in the telephoto image in operation 608. If an object is determined to be identifiably present in the telephoto image in operation 608 but is not determined to be identifiably present in the wide-angle image in operation 604, the stereo camera assembly is moved towards the object in operation 614. When the object is determined to be identifiably present in the telephoto image but not the wide-angle image, the stereo camera assembly is too far away from the object to determine its three-dimensional coordinate position. When the object is determined to be identifiably present in the telephoto image but not the wide-angle image, the location of the object in the telephoto image is used to direct the stereo camera assembly towards the object. Moving the stereo camera assembly in operation 614 can be performed in any desirable fashion. In some illustrative examples the stereo camera assembly is mounted on a platform and the stereo camera assembly has a movement system that moves the stereo camera assembly independently of the platform. In some illustrative examples the stereo camera assembly is mounted on a platform and the stereo camera assembly is moved by moving the platform using a movement system of the platform.

If an object is not identifiably present in either the wide-angle image or the telephoto image, monitoring continues in operation 616. Monitoring in operation 616 continues by analyzing subsequent wide-angle and telephoto images.

After completing any of operation 610, operation 612, operation 614, or operation 616, flowchart 600 returns to the start. Flowchart 600 is repeatedly performed to position the stereo camera assembly and perform object tracking. In some illustrative examples, by repeatedly performing flowchart 600, stereo camera assembly is repositioned relative to the object to enable performance of object tracking. In some illustrative examples, by repeatedly performing flowchart 600, object tracking is performed. Object tracking is performed by receiving subsequent wide-angle and telephoto images and performing image analysis on the subsequent images in operation 610.

Figure 7:
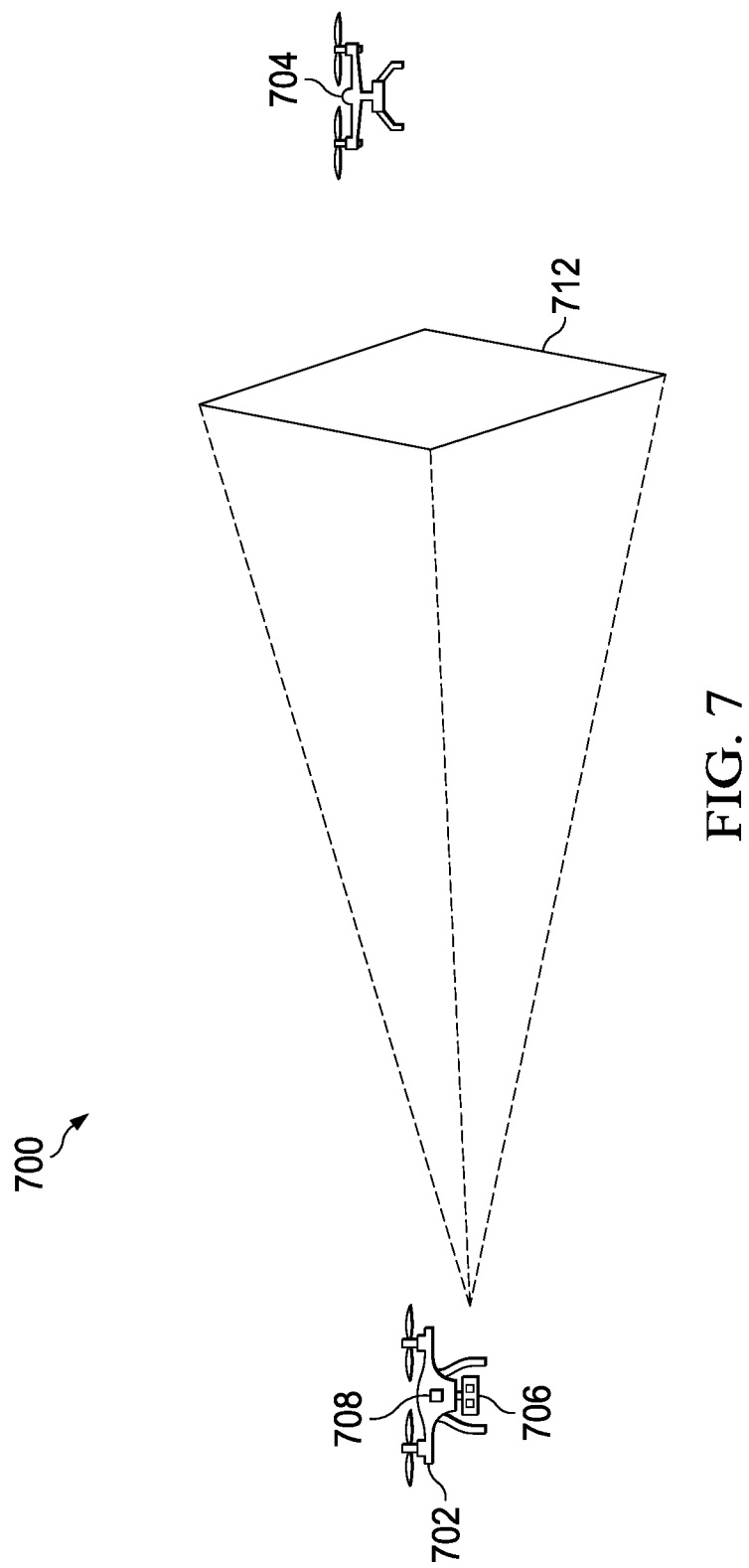
FIG. 7 is a pictorial illustration of a tracking environment in accordance with an illustrative embodiment.

Turning now to FIG. 7, a pictorial illustration of a tracking environment is depicted in accordance with an illustrative embodiment. Tracking environment 700 is a physical implementation of tracking environment 1200 of FIG. 12. In some illustrative examples, tracking environment 700 is another view of tracking environment 300 of FIGS. 3-5. In this illustrative example, tracking environment 700 is an environment in which aerial vehicle 702 tracks moving object

704. In other implementations of tracking environment 700, other types of objects can be tracked in addition to or in place of moving object 704, and other platforms can be used to perform tracking in addition to or in place of aerial vehicle 702.

As depicted in this illustrative, non-limiting example, aerial vehicle 702 carries stereoscopic imaging system payload 706. In this illustrative example, stereoscopic imaging system payload 706 comprises a wide-angle lens camera and a telephoto lens camera.

Stereoscopic imaging system payload 706 can generate stereoscopic graphic images.

In the illustrative example, object tracker 708 is located in a data processing system in aerial vehicle 702 and tracks moving object 704 using data generated by stereoscopic imaging system payload 706.

As depicted, the stereoscopic camera system in stereoscopic imaging system payload 706 generates image pairs. An image pair is a pair of images such as two stereoscopic images. Each image in the image pair is created by one of two cameras that are offset from each other in the stereoscopic camera system and may have a relative rotation.

In this illustrative example, the stereoscopic camera system comprises two different kinds of cameras. In this illustrative example, the stereoscopic imaging system comprises a wide-angle lens camera and a telephoto lens camera. The stereoscopic imaging system generates stereoscopic images within field of view 712 of the stereoscopic camera system in stereoscopic imaging system payload 706. Field of view 712 of the stereoscopic camera system includes the field of view of the wide-angle lens camera and the field of view of the telephoto lens camera. In some illustrative examples, the field of view of the wide-angle lens camera encompasses the field of view of the telephoto lens camera and field of view 712 of the stereoscopic camera system is the field of view of the wide-angle lens camera.

In some illustrative examples, stereoscopic imaging system payload 706 further comprises a light source/focused light. In some illustrative examples, the type of light may be selected from any light spectrum band, including visible, infrared, and ultraviolet. The illumination is a wavelength or range or wavelengths that can be detected by the stereoscopic camera system and does not need to be visible to a human eye. In this illustrative example, field of view 712 is the extent of tracking environment 700 that can be captured in an image at any given moment.

In this illustrative example, object tracker 708 detects moving object 704 within the stereoscopic images and determines a bounding box for moving object 704 in these two stereoscopic images.

Based on the bounding box, object tracker 708 also determines a region of interest and applies a mask based on the region of interest to the stereoscopic images to form masked images. Object tracker 708 identifies one or more common pixels between the masked images. The common pixels are used to determine a three-dimensional position of moving object 704.

Further, object tracker 708 can predict a subsequent three-dimensional position of moving object 704 using the three-dimensional position of moving object 704 and prior three-dimensional positions of moving object 704. A path for moving object 704 can also be determined by object tracker 708.

When subsequent image pairs comprising subsequent pairs of images are received, the region of interest can be determined without needing to perform object detection on the stereoscopic images and create a bounding box. With the subsequent image pairs, object tracker 708 can determine the new region of interest based on the prior region of interest and a predicted subsequent three-dimensional position of moving object 704. As a result, time and processing resources needed to perform detection and generate a bounding box can be omitted with subsequent image pairs.

The process for detecting moving object 704 by generating a bounding box in a subsequent image pair may be performed if common pixels cannot be identified for moving object 704 in the region of interest for the subsequent image pair. The detection by generating the bounding box in a subsequent image pair can also be performed to validate that the common pixels identified do belong to moving object 704.

With the ability to track moving object 704, a number of different actions can be performed. For example, by nailing the position and subsequent three-dimensional positions of moving object 704, object tracker 708 can operate stereoscopic imaging system payload 706 to continue to direct a light source at moving object 704 to illuminate moving object 704.

As another example, aerial vehicle 702 and moving object 704 can be a part of a swarm of aerial vehicles flying coordinated maneuvers such as in a tight formation and capable of changing formation shapes for an artistic display or light show. With the ability to determine positions and track movement, tighter and more precise formations can be achieved by coordinated flying of aerial vehicle 702 and moving object 704.

Additionally, collision avoidance can be informed using this information as well as other actions. For example, determined position of moving object 704 can be used by a flight control system in the aerial vehicle 702 to change the flight path of aerial vehicle 702.

The illustration of tracking environment 700 in FIG. 7 is provided as an example of one implementation in which tracking can be performed in accordance with an illustrative embodiment. This illustration is not meant to limit the manner in which other examples can be implemented. For example, one or more aerial vehicles can be present in addition to aerial vehicle 702 and moving object 704. These additional aerial vehicles can be tracked by aerial vehicle 702. Alternatively, the other aerial vehicles can also track moving object 704 when flying as a swarm to perform coordinated maneuvers.

Figure 8:
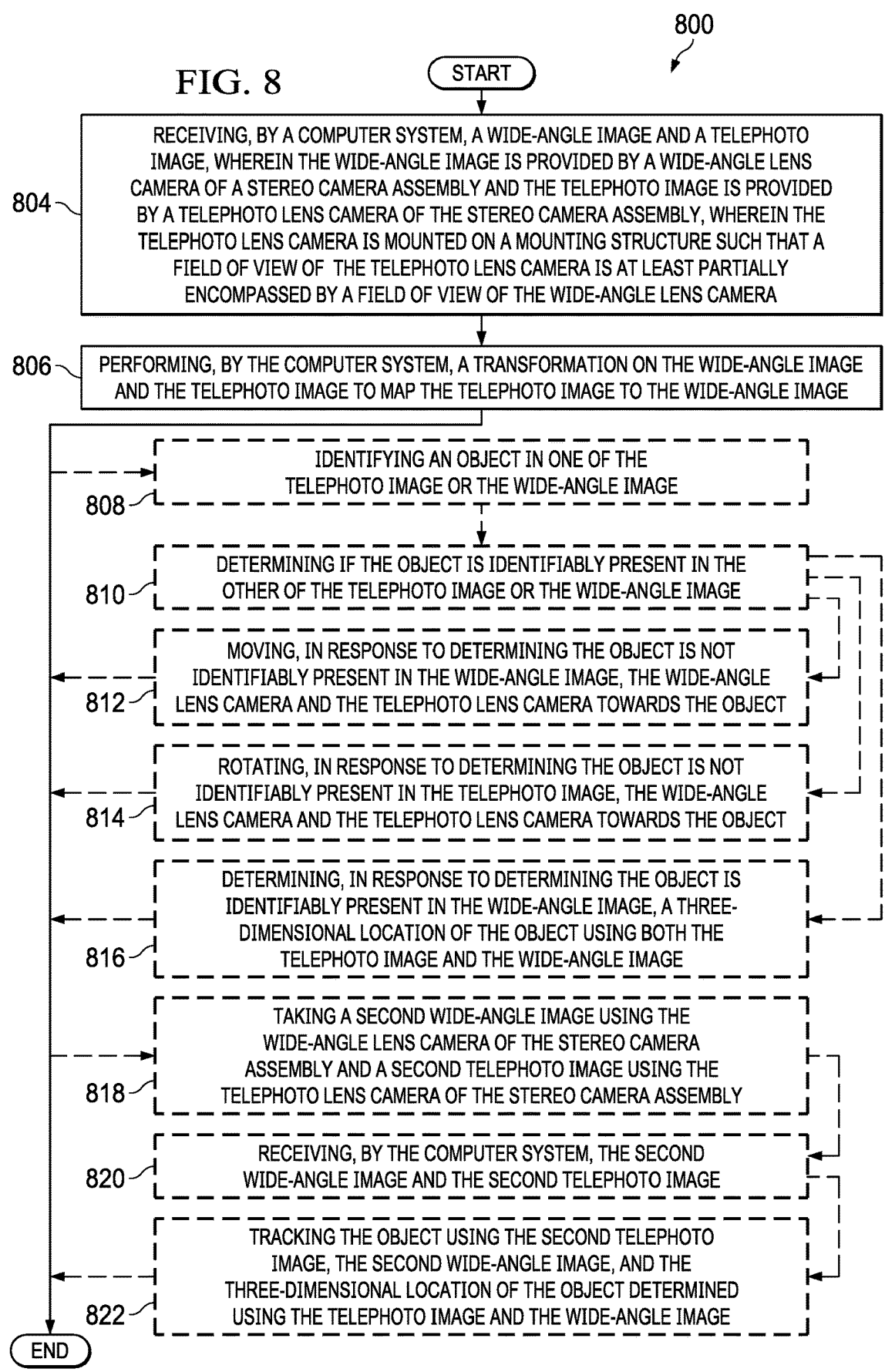
FIG. 8 is an illustration of a flowchart of a process for object tracking in accordance with an illustrative embodiment.

Turning next to FIG. 8, an illustration of a flowchart of a process for object tracking is depicted in accordance with an illustrative embodiment. Process 800 of FIG. 8 can be implemented in hardware, software, or both. When implemented in software, the process can take the form of program code that is run by one or more processor units located in one or more hardware devices in one or more computer systems. For example, process 800 can be implemented in object tracking system 1204 including object tracker 1208 in computer system 1206 of FIGS. 12 and 15. Portions of process 800 can be implemented in data processing system 1600 of FIG. 16. Process 800 can be implemented using stereoscopic imaging system 100 of FIG. 1. Stereoscopic images 200 of FIG. 2 can be taken during process 800 of FIG. 8. Process 800 can be implemented using stereo camera assembly 307 of FIGS. 3-5. Process 800 can be implemented in tracking environment 700 using stereoscopic imaging system payload 706 of FIG. 7.

Process 800 takes a wide-angle image using a wide-angle lens camera of a stereo camera assembly and a telephoto image using a telephoto lens camera of the stereo camera assembly, wherein the telephoto lens camera is mounted on a mounting structure such that a field of view of the telephoto lens camera is at least partially encompassed by a field of view of the wide-angle lens camera (operation 802). In some illustrative examples, in operation 802, the images are taken simultaneously or substantially simultaneously. In some illustrative examples, the telephoto lens camera is mounted on a mounting structure such that a field of view of the telephoto lens camera is completely encompassed by a field of view of the wide-angle lens camera.

A computer system receives the wide-angle image and the telephoto image (operation 804). The computer system performs a transformation on the wide-angle image and the telephoto image to map the telephoto image to the wide-angle image (operation 806). This mapping takes into account the positioning of the lenses and the different fields of view into account. In some illustrative examples, the mapping can also take into account differences in the optical distortion between the two different focal length lenses. In an example, after operation 806, process 800 can terminate.

In some illustrative examples of process 800, the computer system identifies an object in one of the telephoto image or the wide-angle image (operation 808). In some illustrative examples of process 800, the computer system determines if the object is identifiably present in the other of the telephoto image or the wide-angle image (operation 810).

In some illustrative examples, identifying the object in one of the telephoto image or the wide-angle image comprises identifying the object in the telephoto image. In some of these illustrative examples, process 800 moves, in response to determining the object is not identifiably present in the wide-angle image, the stereo camera assembly towards the object (operation 812).

In some illustrative examples, identifying the object in one of the telephoto image or the wide-angle image comprises identifying the object in the wide-angle image. In some of these illustrative examples, process 800 rotates, in response to determining the object is not identifiably present in the telephoto image, the stereo camera assembly towards the object (operation 814). The rotation can be about any desirable axis. For example, the rotation of the stereo camera assembly can be about at least one of a pitch axis, a roll axis, or a yaw axis.

In some illustrative examples, identifying the object in one of the telephoto image or the wide-angle image comprises identifying the object in the telephoto image, wherein the object is determined to be identifiably present in the wide-angle image. In some of these illustrative examples, process 800 determines, in response to determining the object is identifiably present in the wide-angle image, a three-dimensional location of the object using both the telephoto image and the wide-angle image (operation 816).

After determining a three-dimensional location of the object using both the telephoto image and the wide-angle image in operation 816, the object can be tracked using subsequent images. For example, operation 818 through operation 822 can be performed after operation 816 to track the object using a subsequent pair of images.

In some illustrative examples, process 800 takes a second wide-angle image using the wide-angle lens camera of the stereo camera assembly and a second telephoto image using the telephoto lens camera of the stereo camera assembly (operation 818). In some illustrative examples, process 800 receives, by the computer system, the second wide-angle image and the second telephoto image (operation 820). In some illustrative examples, process 800 tracks the object using the second telephoto image, the second wide-angle image, and the three-dimensional location of the object determined using the telephoto image and the wide-angle image (operation 822).

Figure 9:
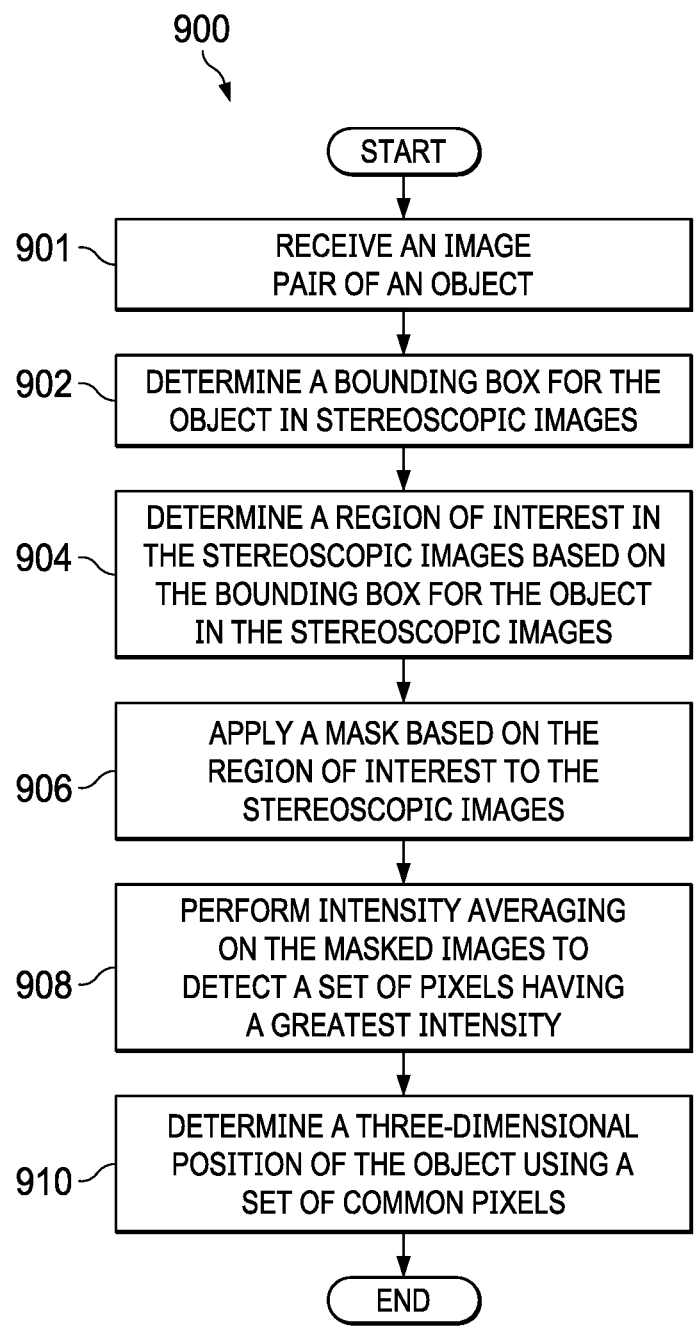
FIG. 9 is an illustration of a flowchart of a process for tracking an object in accordance with an illustrative embodiment.

Turning next to FIG. 9, an illustration of a flowchart of a process for tracking an object is depicted in accordance with an illustrative embodiment. The process of FIG. 9 can be implemented in hardware, software, or both. When implemented in software, the process can take the form of program code that is run by one or more processor units located in one or more hardware devices in one or more computer systems. For example, the process can be implemented in object tracker 1208 in computer system 1206 of FIGS. 12 and 15.

The process begins by receiving an image pair of an object (operation 901). In operation 901, the image pair comprises two stereoscopic images generated by a stereoscopic imaging system. The process determines a bounding box for the object in stereoscopic images (operation 902).

The process determines a region of interest in the stereoscopic images based on the bounding box for the object in the stereoscopic images (operation 904). The process applies a mask based on the region of interest to the stereoscopic images (operation 906). In operation 906, the mask masks out portions of the stereoscopic images outside of the region of interest to form masked images.

The process performs intensity averaging on the masked images to detect a set of pixels having a greatest intensity in the masked images (operation 908). The set of pixels in the masked images in operation 908 are a set of common pixels in the masked images in which the set of common pixels is assumed to have a same location in both of the masked images. The process determines a three-dimensional position of the object using a set of common pixels (operation 910). The process terminates thereafter.

In some illustrative examples, additional operations may be performed in process 900. In some illustrative examples, some operations of process 800 may be performed during process 900. For example, operation 806, operation 808, and operation 810 can be performed between operations 901 and operation 902. As another example, operation 901 may be either of operation 804 or operation 820. As yet another example, either of operation 812 or 814 may be performed prior to performing operation 901.

Figure 10:
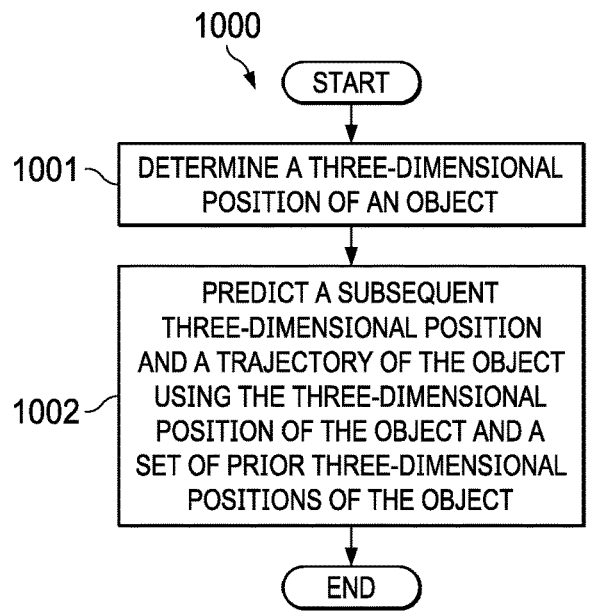
FIG. 10 is an illustration of a flowchart of a process for predicting a subsequent three-dimensional position of an object in accordance with an illustrative embodiment.

Turning next to FIG. 10, an illustration of a flowchart of a process for predicting a subsequent three-dimensional position of an object is depicted in accordance with an illustrative embodiment. The process of FIG. 10 can be implemented in hardware, software, or both. When implemented in software, the process can take the form of program code that is run by one or more processor units located in one or more hardware devices in one or more computer systems. For example, the process can be implemented in object tracker 1208 in computer system 1206 of FIG. 12.

The process begins by determining a three-dimensional position of an object (operation 1001). In this illustrative example, the three-dimensional position of the object can be determined using the operations in the flowchart of FIG. 9.

The process predicts a subsequent three-dimensional position and a trajectory of the object using the three-dimensional position of the object and a set of prior three-dimensional positions of the object (operation 1002). The process terminates thereafter.

Figure 11:
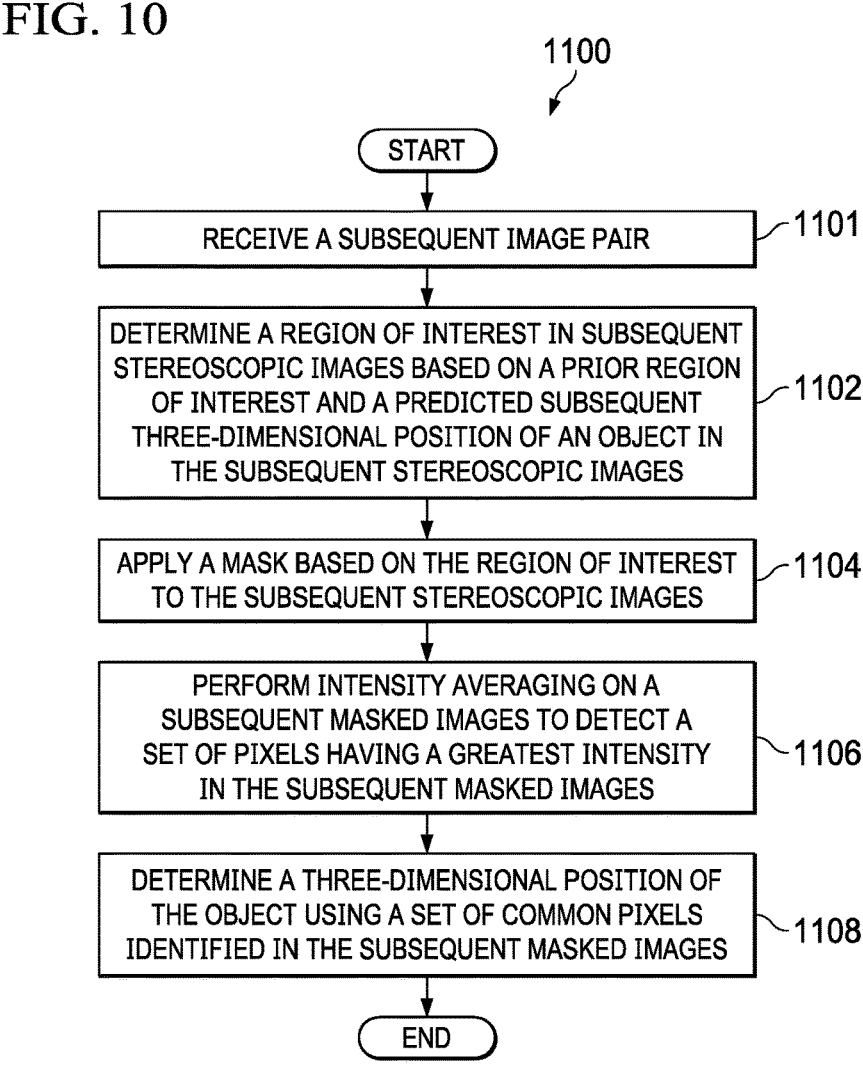
FIG. 11 is an illustration of a flowchart of a process for predicting a subsequent three-dimensional position of an object in accordance with an illustrative embodiment.

With reference now to FIG. 11, an illustration of a flowchart of a process for predicting subsequent three-dimensional positions of an object is depicted in accordance with an illustrative embodiment. The process of FIG. 11 can be implemented in hardware, software, or both. When implemented in software, the process can take the form of program code that is run by one or more processor units located in one or more hardware devices in one or more computer systems. For example, the process can be implemented in object tracker 1208 in computer system 1206 of FIG. 12.

This process can be used when subsequent image pairs are received and can begin after the completion of operation 910 of FIG. 9. The illustrated process in FIG. 11 omits object detection and boundary box generation, resulting in at least one of increasing a speed at which a three-dimensional position of the object can be determined or reducing a use of processor resources used to determine a three-dimensional position of the object.

The process begins by receiving a subsequent image pair (operation 1101). In operation 1101, the subsequent image pair comprises subsequent stereoscopic images generated by a stereoscopic imaging system. The process determines a region of interest in subsequent stereoscopic images based on a prior region of interest and a predicted subsequent three-dimensional position of an object in the subsequent stereoscopic images (operation 1102).

The process applies a mask based on the region of interest to the subsequent stereoscopic images (operation 1104). The mask in operation 1104 masks out the portions of the subsequent stereoscopic images outside of the region of interest to form subsequent masked images.

The process performs intensity averaging on subsequent masked images to detect a set of pixels having a greatest intensity in the subsequent masked images (operation 1106). The set of pixels in the subsequent masked images in operation 1106 is the set of common pixels in the subsequent masked images that is assumed to have the same location. The process determines a three-dimensional position of the object using a set of common pixels identified in the subsequent masked images (operation 1108). The process terminates thereafter.

In some illustrative examples, additional operations may be performed in process 900. In some illustrative examples, some operations of process 800 may be performed during process 900. For example, operation 806, operation 808, and operation 810 can be performed between operations 901 and operation 902.

In some illustrative examples, operation 902 through operation 910 of process 900 are performed during operation 822. Process 900 performs object tracking utilizing intensity averaging.

In some illustrative examples, object tracking in process 800 is performed in other desirable ways. In some illustrative examples, object tracking in process 800 is accomplished by image recognition or other desirable processes.

The flowcharts and block diagrams in the different depicted examples illustrate the architecture, functionality, and operation of some possible implementations of apparatuses and methods in illustrative examples. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of illustrative examples, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 808 through operation 822 may be optional.

Figure 12:
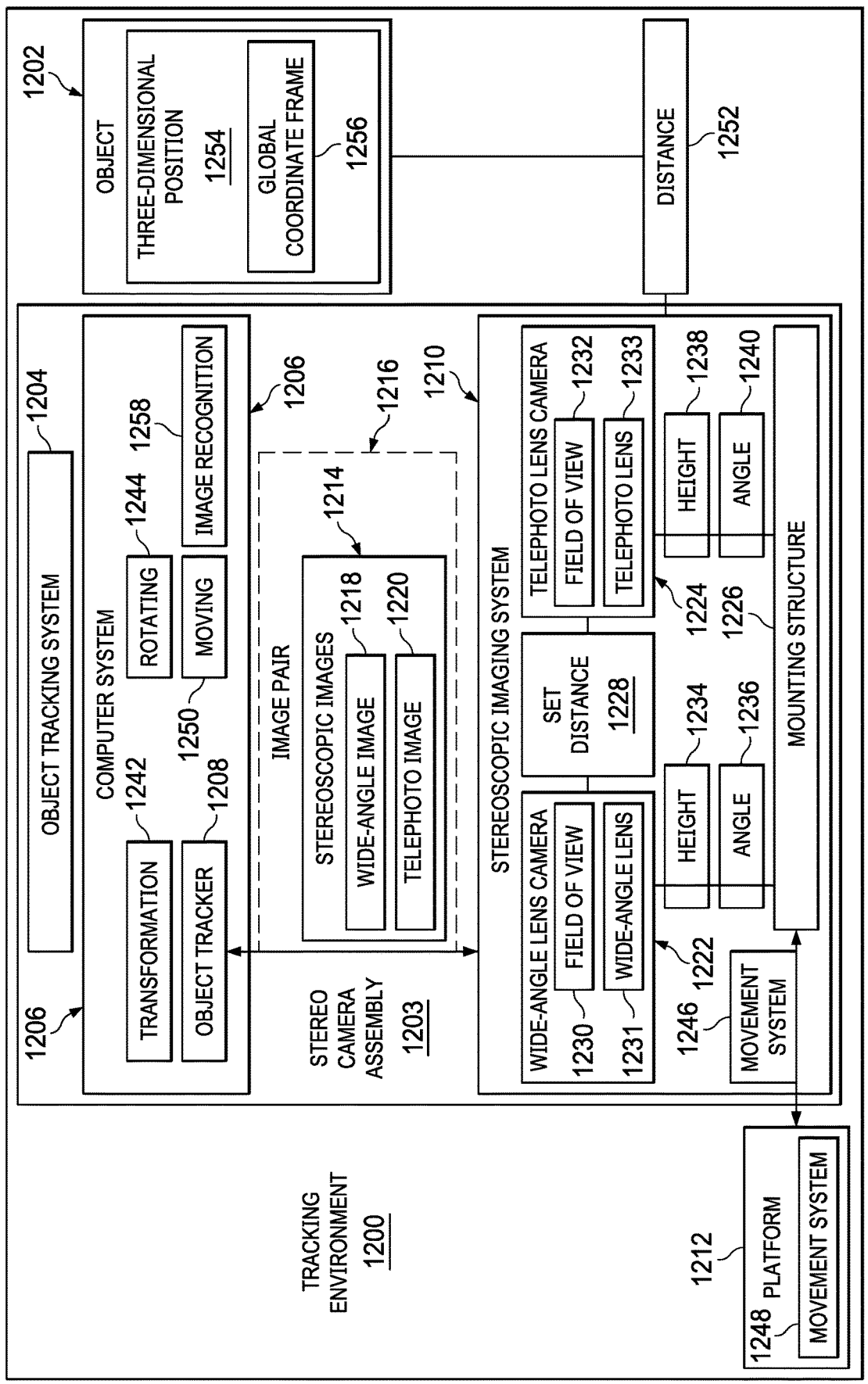
FIG. 12 is an illustration of a block diagram of a tracking environment in accordance with an illustrative embodiment.

Turning now to FIG. 12, an illustration of a block diagram of a tracking environment is depicted in accordance with an illustrative embodiment. Tracking environment 1200 is an environment in which object 1202 can be tracked. Object 1202 and stereo camera assembly 1203 are present in tracking environment 1200.

Object 1202 is a physical real-world object that can be tracked by object tracking system 1204. Object 1202 can take a number of different forms. For example, object 1202 can be one of a moving object, a stationary object, an aerial vehicle, an aircraft, an airplane, a rotorcraft, an unmanned aerial vehicle, a micro aerial vehicle, a rocket, a spacecraft, a ground vehicle, an unmanned ground vehicle, a train, a surface ship, a bus, a semi-trailer truck, a high mobility multipurpose wheeled vehicle, and other types of objects.

In this illustrative example, object tracking system 1204 comprises computer system 1206, object tracker 1208, and stereoscopic imaging system 1210. Object tracker 1208 is located in computer system 1206.

As depicted, object tracking system 1204 is connected to platform 1212. Platform 1212 can take a number of different forms. For example, platform 1212 can be one of an aircraft, an airplane, a rotorcraft, an unmanned aerial vehicle, a micro aerial vehicle, a ship, a train, a rocket, a spacecraft, a satellite, a stationary platform, a moving platform, an aquatic platform, a space platform, a building, or other suitable types of platforms.

When one component is "connected" to another component, the connection is a physical association. For example, a first component can be considered to be physically connected to a second component by at least one of being secured to the second component, bonded to the second component, mounted to the second component, welded to the second component, fastened to the second component, or connected to the second component in some other suitable manner. The first component can also be connected to the second component using a third component. The first component can also be considered to be physically connected to the second component by being formed as part of the second component, an extension of the second component, or both.

In this illustrative example, object tracker 1208 can be implemented in software, hardware, firmware, or a combination thereof. When software is used, the operations performed by object tracker 1208 can be implemented in program code configured to run on hardware, such as a processor unit. When firmware is used, the operations performed by object tracker 1208 can be implemented in program code and data and stored in persistent memory to run on a processor unit. When hardware is employed, the hardware can include circuits that operate to perform the operations in object tracker 1208.

In the illustrative examples, the hardware can take a form selected from at least one of a circuit will do system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 1206 is a physical hardware system and includes one or more data processing systems. When more than one data processing system is present in computer system 1206, those data processing systems are in communication with each other using a communications medium. The communications medium can be a network. The data processing systems can be selected from at least one of a computer, a server computer, a tablet computer, or some other suitable data processing system.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, "a number of," when used with reference to items means one or more items.

In this illustrative example, stereoscopic imaging system 1210 is a hardware system in communication with object tracker 1208. Stereoscopic imaging system 1210 comprises two cameras. The two cameras are offset from each other and generate stereoscopic images 1214. Stereoscopic images 1214 can also be referred to as image pair 1216.

Stereoscopic images 1214 include wide-angle image 1218 and telephoto image 1220. Stereoscopic images 1214 are generated by two cameras in stereoscopic imaging system 1210. Wide-angle image 1218 is captured by wide-angle lens camera 1222 of stereoscopic imaging system 1210. Telephoto image 1220 is captured by telephoto lens camera 1224 of stereoscopic imaging system 1210.

Wide-angle lens camera 1222 is mounted on mounting structure 1226. Telephoto lens camera 1224 is mounted on mounting structure 1226. Telephoto lens camera 1224 is mounted on mounting structure 1226 such that field of view 1232 of telephoto lens camera 1224 is at least partially encompassed by field of view 1230 of wide-angle lens camera 1222. In some illustrative examples, telephoto lens camera 1224 is mounted on mounting structure 1226 set distance 1228 away from wide-angle lens camera such that field of view 1232 of telephoto lens camera 1224 is completely encompassed by field of view 1230 of wide-angle lens camera 1222.

Wide-angle lens camera 1222 comprises wide-angle lens 1231 and an image sensor. Telephoto lens camera 1224 comprises telephoto lens 1233 and an image sensor. Field of view 1230 of wide-angle lens camera 1222 is affected by wide-angle lens 1231. Exchanging wide-angle lens 1231 for a lens with different specifications will change field of view 1230. Field of view 1232 is affected by telephoto lens 1233. Exchanging telephoto lens 1233 for a lens with different specifications will change field of view 1232.

Wide-angle lens camera 1222 is mounted on mounting structure 1226 at height 1234 and angle 1236. Telephoto lens camera 1224 is mounted on mounting structure 1226 at height 1238 and angle 1240. Each of height 1234, angle 1236, height 1238, and angle 1240 are selected such that field of view 1232 of telephoto lens camera 1224 is at least partially encompassed by field of view 1230 of wide-angle lens camera 1222. In some illustrative examples, each of height 1234, angle 1236, height 1238, and angle 1240 are selected such that field of view 1232 of telephoto lens camera 1224 is completely encompassed by field of view 1230 of wide-angle lens camera 1222.

In some illustrative examples, wide-angle lens camera 1222 and telephoto lens camera 1224 are mounted at a same height of mounting structure 1226. In these illustrative examples, height 1234 and height 1238 are substantially the same. In some illustrative examples, by mounting wide-angle lens camera 1222 and telephoto lens camera 1224 at a same height of mounting structure 1226, processing resources are reduced for image analysis.

In some illustrative examples, wide-angle lens camera 1222 and telephoto lens camera 1224 are mounted at a same angle relative to mounting structure 1226. In these illustrative examples, angle 1236 and angle 1240 are substantially the same. In some illustrative examples, by mounting wide-angle lens camera 1222 and telephoto lens camera 1224 at a same angle relative to mounting structure 1226, processing resources are reduced for image analysis.

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

In some illustrative examples, mounting structure 1226 is configured to be connected to platform 1212. In these illustrative examples, mounting structure 1226 is separate from platform 1212 but can be connected to platform 1212. In some of these illustrative examples, mounting structure 1226 is a component of stereoscopic imaging system 1210. In some illustrative examples, stereoscopic imaging system 1210 is mounted on platform 1212. In other illustrative examples, mounting structure 1226 is a component of platform 1212. In these illustrative examples, mounting structure 1226 can be present in platform 1212 independent of presence of stereoscopic imaging system 1210.

Wide-angle lens camera 1222 and telephoto lens camera 1224 are two different types of lenses. For example, wide-angle lens camera 1222 can have a spherical aberration. A direct pixel to pixel correlation cannot be made without further analysis. Transformation 1242 is performed on wide-angle image 1218 and telephoto image 1220 to map telephoto image 1220 to wide-angle image 1218.

As depicted, object tracker 1208 is configured to perform a number of different operations in tracking object 1202. For example, object tracking system 1204 is configured to reposition stereoscopic imaging system 1210 within tracking environment 1200 to track object 1202. In some illustrative examples, object tracking system 1204 repositions stereoscopic imaging system 1210 within tracking environment 1200 in response to object 1202 only being identifiably present within one image of image pair 1216.

When object 1202 is identifiably present in an image, the object is present in the field of view of the lens taking the image at the time the image is taken. When object 1202 is identifiably present in wide-angle image 1218, object 1202 was in field of view 1230 of wide-angle lens camera 1222 when wide-angle image 1218 was taken. When object 1202 is identifiably present in telephoto image 1220, object 1202 was in field of view 1232 of telephoto lens camera 1224 when telephoto image 1220 was taken.

Object 1202 is identifiably present within an image when object 1202 is not only present, but large enough to be identified within the image. When object 1202 is identifiably present in wide-angle image 1218 but not telephoto image 1220, object 1202 is positioned outside of field of view 1232 of telephoto lens camera 1224. When object 1202 is identifiably present in wide-angle image 1218 but not telephoto image 1220, object 1202 is positioned one of above, below, or to the side of field of view 1232 of telephoto lens camera 1224. In one illustrative example, when object 1202 is identifiably present in wide-angle image 1218 but not telephoto image 1220, stereo camera assembly 1203 is rotated towards object 1202. By rotating 1244 towards object 1202, object 1202 is desirably within both field of view 1230 of wide-angle lens camera 1222 and field of view 1232 of telephoto lens camera 1224.

The rotation can be about any desirable axis. For example, the rotation of stereo camera assembly 1203 can be about at least one of a pitch axis, a roll axis, or a yaw axis.

In some illustrative examples, computer system 1206 sends commands for rotating 1244 of stereo camera assembly 1203 in response to object 1202 being identifiably present in wide-angle image 1218 but not telephoto image 1220. In some illustrative examples, stereo camera assembly 1203 is rotated towards object 1202 by moving stereo camera assembly 1203 using movement system 1246 of stereo camera assembly 1203. When stereo camera assembly 1203 is moved using movement system 1246 of stereo camera assembly 1203, stereo camera assembly 1203 is moved independently of platform 1212. In some illustrative examples, movement system 1248 of platform 1212 is used to move stereo camera assembly 1203 with platform 1212. In some illustrative examples, platform 1212 is a vehicle and stereo camera assembly 1203 is moved by controlling the vehicle using movement system 1248.

In some illustrative examples, computer system 1206 sends commands for moving 1250 of stereo camera assembly 1203 in response to object 1202 being identifiably present in telephoto image 1220 but not wide-angle image 1218. In one illustrative example, when object 1202 is identifiably present in telephoto image 1220 but not wide-angle image 1218, stereo camera assembly 1203 is moved towards object 1202. When object 1202 is identifiably present in telephoto image 1220 but not wide-angle image 1218, distance 1252 between stereoscopic imaging system 1210 and object 1202 is decreased by moving 1250 stereo camera assembly 1203 towards object 1202. By decreasing distance 1252 between stereoscopic imaging system 1210 and object 1202, object tracking of object 1202 can eventually be performed. When object 1202 is identifiably present in both telephoto image 1220 and wide-angle image 1218, object tracking by object tracker 1208 can be performed.

Object tracker 1208 determines three-dimensional position 1254 of object 1202 using stereoscopic images 1214. In the illustrative example, three-dimensional position 1254 can be a location of object 1202 in a three-dimensional space and can include an orientation of the object 1202. Three-dimensional position 1254 can be described using three-dimensional coordinates for a three-dimensional coordinate system. The three-dimensional coordinate system can be, for example, a Cartesian coordinate system, a spherical coordinate system, or some other suitable type of coordinate system that can describe locations in a three-dimensional space.

Further, three-dimensional position 1254 can also include an orientation of object 1202. In other words, this position can also include a direction in which object 1202 is pointing.

Three-dimensional position 1254 determined by object tracker 1208 can be initially a position in a camera coordinate frame. In the camera coordinate frame, three-dimensional position 1254 is a location of object 1202 is relative to platform 1212 or object tracking system 1204. Three-dimensional position 1254 can be determined by performing triangulation on object 1202 identified in stereoscopic images 1214. In this illustrative example, the triangulation can be performed using the positions of wide-angle lens camera 1222 and telephoto lens camera 1224 in stereoscopic imaging system 1210 and transformation 1242. In some illustrative example, three-dimensional position 1254 is maintained in the position of the camera coordinate frame.

Object tracker 1208 can convert the position of object 1202 from a camera coordinate frame to global coordinate frame 1256 to obtain three-dimensional position 1254 of object 1202. In other illustrative examples, the conversion can be to other coordinate frames other than global coordinate frame 1256. Another coordinate frame can be an inertial local coordinate frame with the center of gravity of the platform 1212 being the origin of the coordinate frame.

In the illustrative example, a coordinate frame is a coordinate system for a frame of reference. For example, a camera coordinate frame describes the position of objects using stereoscopic imaging system 1210 as the frame of reference.

Object tracker 1208 can continue to receive image pairs from stereoscopic imaging system 1210. Subsequent image pairs comprise subsequent stereoscopic images generated by stereoscopic imaging system 1210.

In some illustrative examples, computer system 1206 performs image recognition 1258 to identify a type of structure of object 1202. Image recognition 1258 may be performed on wide-angle image 1218, telephoto image 1220, or a combination of the two. In some illustrative examples, by performing image recognition 1258, computer system 1206 can determine if object 1202 is a type of structure to be monitored. For example, by performing image recognition 1258, it may be determined that object 1202 is not to be monitored. In some illustrative examples, if it is determined that object 1202 is not to be monitored, stereo camera assembly 1203 is not moved relative to object 1202 in response to object 1202 being out of field of view 1230 or field of view 1232. In some illustrative examples, if it is determined that object 1202 is not to be monitored, data regarding the location of object 1202 can still be used to avoid collision of platform 1212 with object 1202.

In some illustrative examples, by performing image recognition 1258, computer system 1206 can determine if object 1202 is a specific object to be tracked or monitored. In some illustrative examples, by performing image recognition 1258, computer system 1206 can distinguish between object 1202 and other objects that may be present in stereoscopic images 1214.

In some illustrative examples, object tracking system 1204 comprises wide-angle lens camera 1222, telephoto lens camera 1224, computer system 1206, and a movement system. Wide-angle lens camera 1222 is mounted on mounting structure 1226. Telephoto lens camera 1224 is mounted on mounting structure 1226 such that field of view 1232 of telephoto lens camera 1224 is at least partially encompassed by field of view 1230 of wide-angle lens camera 1222.

Computer system 1206 is configured to receive wide-angle image 1218 from wide-angle lens camera 1222, receive telephoto image 1220 from telephoto lens camera 1224, determine whether object 1202 is identifiably present within wide-angle image 1218, determine whether object 1202 is identifiably present within telephoto image 1220, and generate commands to move mounting structure 1226 in response to determining object 1202 is identifiably present in only one of telephoto image 1220 or wide-angle image 1218. The movement system is configured to move mounting structure 1226 in response to receiving commands from computer system 1206. The movement system can take the form of either movement system 1246 or movement system 1248. The commands are configured to maneuver wide-angle lens camera 1222 and the telephoto lens camera 1224 towards the object.

In one illustrative example, one or more technical solutions are present that overcome a technical problem with tracking objects with a desired level of accuracy and a larger area of observation. As a result, one or more technical solutions can provide a technical effect of increasing the area within which an object can be tracked using stereoscopic images. Further, the one or more illustrative examples provide a technical solution in which the stereo camera assembly can be moved to allow enable tracking. Further, the one or more illustrative examples provide a technical solution in which triangulation can be performed at a rate that provides for real-time tracking of objects.

Figure 15:
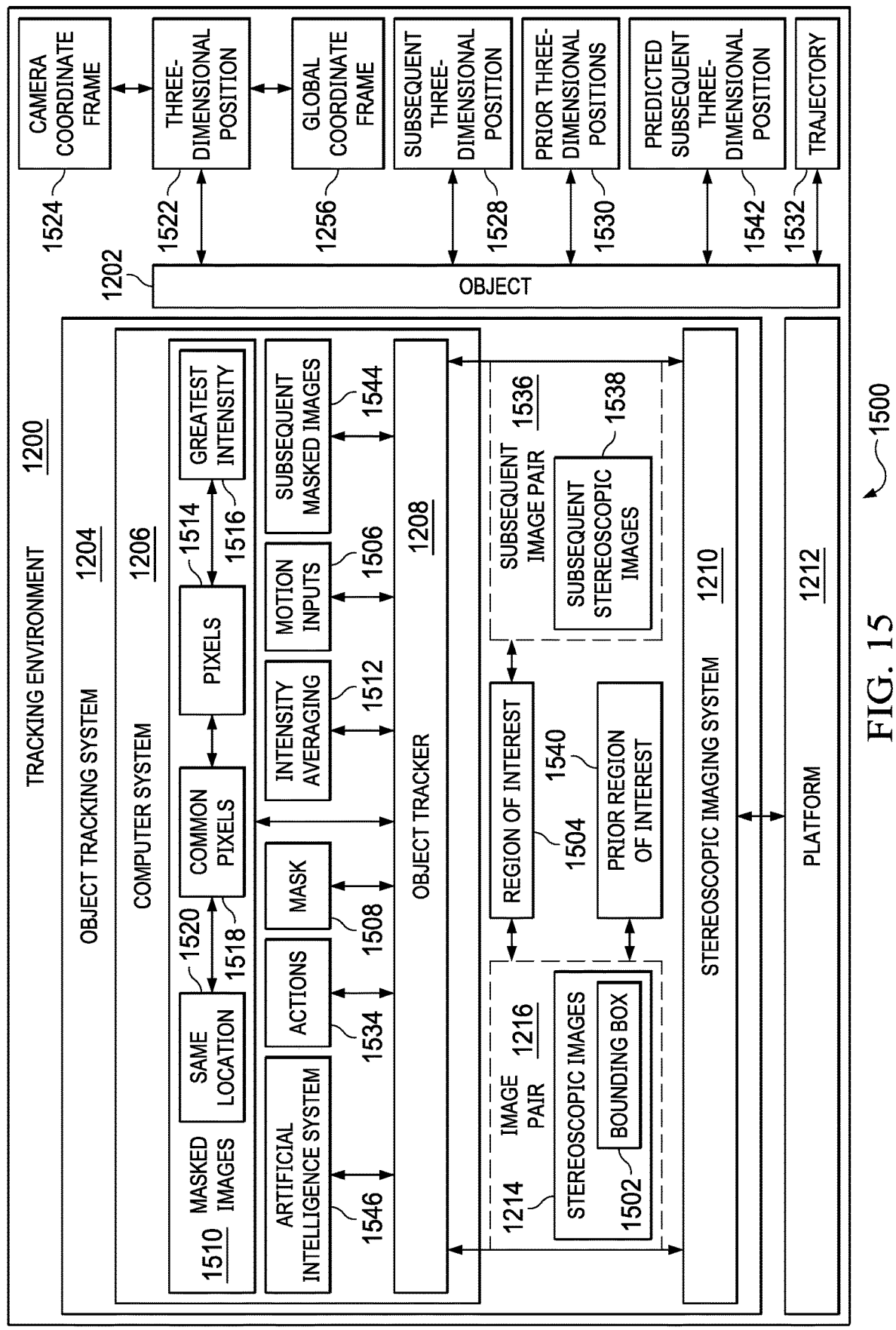
FIG. 15 is an illustration of a block diagram of a tracking environment in accordance with an illustrative embodiment.

The illustrations of tracking environment 1200 in FIGS. 12 and 15 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more components of object tracking system 1204 may not be connected to platform 1212 in some illustrative examples. In one alternative example, object tracker 1208 can be located in a different location from platform 1212. In this implementation, computer system 1206 with object tracker 1208 can receive image pairs from stereoscopic imaging system 1210 over a wireless connection. In still other illustrative examples, object tracker 1208 can be distributed in different locations.

In yet another example, object tracker 1208 can make other predictions in addition to or in place of predicting trajectory 1532 (see FIG. 15) for object 1202. For example, object tracker 1208 can predict the future velocity, acceleration, or other information about object 1202.

Further, when all of object tracking system 1204 is connected to platform 1212, computer system 1206 is one or more data processing systems in platform 1212. For example, when platform 1212 is a commercial airplane, computer system 1206 can be one or more data processing systems in a computer network in the aircraft. When platform 1212 is a micro aerial vehicle, computer system 1206 can be a processor or controller in the micro aerial vehicle. In other illustrative examples, object tracking system 1204 can be distributed between platform 1212 and other locations. For example, stereoscopic imaging system 1210 can be connected to platform 1212 when platform 1212 is a micro aerial vehicle. Object tracker 1208 can be in a remote location communicating with the micro aerial vehicle using wireless communications.

In yet another illustrative example, stereoscopic imaging system 1210 can be a part of a payload such as stereoscopic imaging system payload 706 of FIG. 7.

Figure 13:
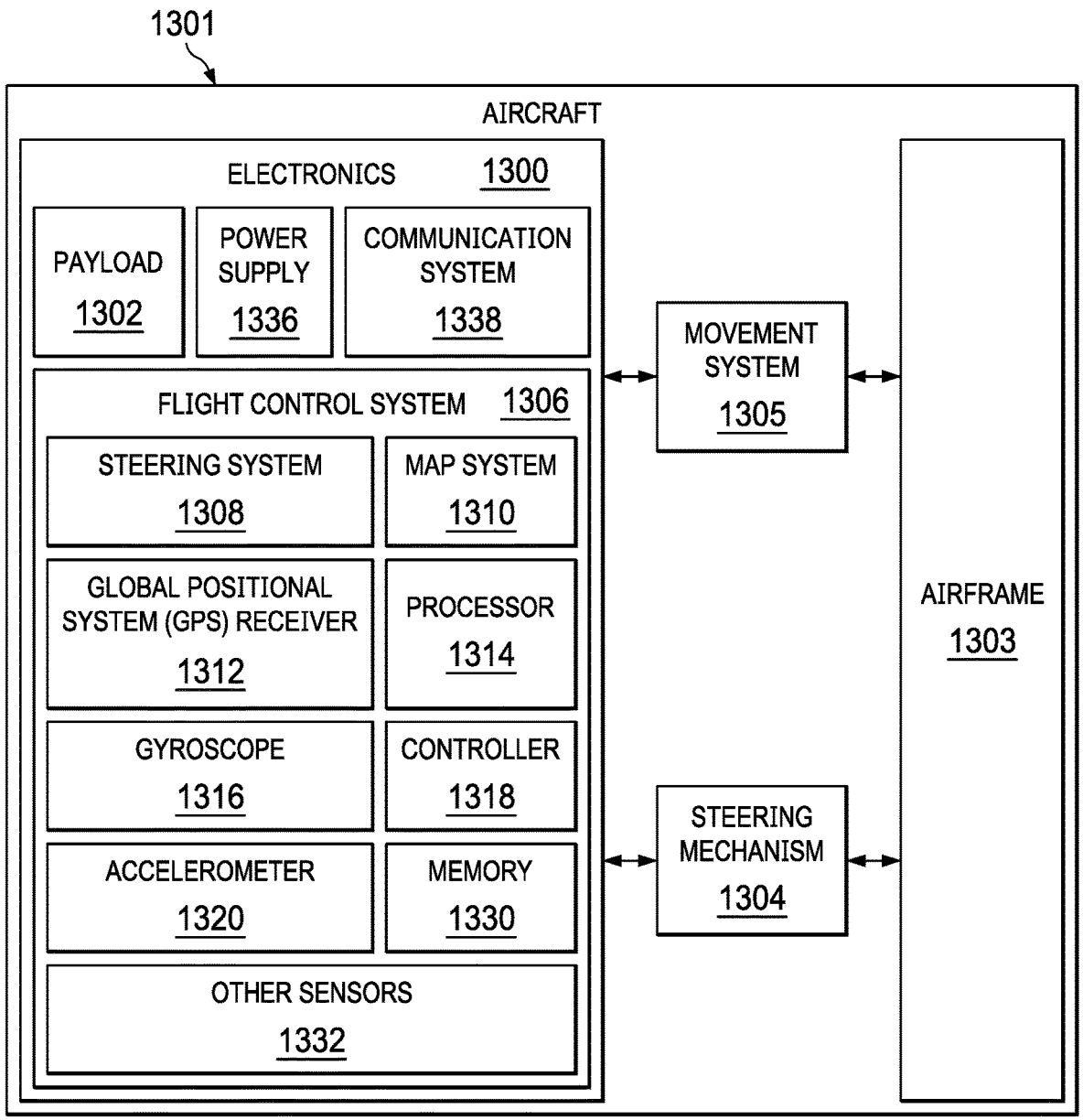
FIG. 13 is an illustration of a block diagram of an aircraft and its components in accordance with an illustrative embodiment.

With reference now to FIG. 13, an illustration of a block diagram of an aircraft and its components is depicted in accordance with an illustrative embodiment. In this illustrative example, aircraft 1301 is an example of one implementation for platform 1212 of FIG. 12. Aircraft 1301 can be, for example, aerial vehicle 702 of FIG. 7.

In this illustrative example, aircraft 1301 includes airframe 1303, electronics 1300, movement system 1305, and steering mechanism 1304. Airframe 1303 is a mechanical structure for aircraft 1301. Airframe 1303 can include, for example, a fuselage, an undercarriage, wings, landing gear, and other physical structures. In this illustrative example, airframe 1303 carries electronics 1300, movement system 1305, and steering mechanism 1304.

As depicted, electronics 1300 include payload 1302, power supply 1336, communication system 1338, and flight control system 1306. In this depicted example, payload 1302 includes a framework or housing that carries components such as stereoscopic imaging system 1210 of FIG. 12.

Although a particular arrangement of components is illustrated in FIG. 13, the arrangement of components may vary in other illustrative examples. For example, payload 1302 may be located within one or more housings that are removable from aircraft 1301. Alternatively, components in payload 1302 can be integrated into aircraft 1301 instead of being placed in a housing that is attached to aircraft 1301 or placed in aircraft 1301.

Further, at least one of payload 1302, flight control system 1306, or communication system 1338 can share components, such as memory, sensors, processors, or controllers. Additionally, payload 1302 can be removably coupled to aircraft 1301 or components in this module can be integrated into airframe 1303 for aircraft 1301 in any desired manner. Thus, the arrangement of the various components may be configured as desired by the designer or operator and therefore should not be limited to a particular example described or illustrated herein.

In this illustrative example, the modular housing for payload 1302 can be constructed of plastic, metal, wood, carbon fiber, a composite material, ceramic, or any material suitable for the purposes of a particular vehicle or type of vehicle. The modular housing may be detachable or ejectable, or it may be permanently coupled to the vehicle. The modular housing may be attached to aircraft 1301 in any manner known to one of ordinary skill in the art. The modular housing may include openings for devices such as stereoscopic imaging system 1210 of FIG. 12. In some illustrative examples, computer system 1206 of FIG. 12 can also be located in payload 1302 or can be located in flight control system 1306 or in some other suitable component within payload 1302.

Although this example shows these components as being located in a housing for payload 1302, this illustration is for purposes of illustrating one manner in which these components can be implemented. This illustration is not meant to limit the manner in which other illustrative examples can be implemented. For example, these components can be distributed in other locations or integrated as part of aircraft 1301 in other illustrative examples.

In this illustrative example, steering mechanism 1304 can be configured to steer aircraft 1301 on a flight path to reach an objective. Steering mechanism 1304 can be operated autonomously or under manned control. In this illustrative example, steering mechanism 1304 responds to signals from controller 1318 in flight control system 1306, which may employ feedback or other control systems to direct aircraft 1301 along a flight path.

As depicted, communication system 1338 is a physical device and may be, for instance, a wireless transceiver and antenna. Communication system 1338 can exchange information with a remote computer system. Communication system 1338 can transmit information generated by payload 1302 to a remote location for processing or storage. For example, communication system 1338 can send images or other data to a ground location or other aircraft.

In this illustrative example, flight control system 1306 can determine one or more flight paths for aircraft 1301 to reach a desired location based upon signals received from the components of a navigation system. Flight control system 1306 can calculate, generate, and send navigation commands, such as data signals, to steering mechanism 1304 to direct aircraft 1301 along a flight path.

In this illustrative example, flight control system 1306 includes steering system 1308, map system 1310, global positioning system (GPS) receiver 1312, processor 1314, gyroscope 1316, controller 1318, accelerometer 1320, and memory 1330. Flight control system 1306 may also include the components described above as being part of electronics 1300, as well as other sensors 1332. For example, other sensors 1332 can also include other flight instrumentation, sensors, processing circuitry, communications circuitry, an optical system including cameras and other sensors that are necessary or useful for operation of an unmanned aerial system, or other autonomously or manually piloted aircraft.

As depicted, map system 1310 can be a part of a map-based flight control system that provides positional information about natural and manmade features within a region. Map system 1310 can communicate with other components in flight control system 1306 to support navigation of aircraft 1301. While this function can include providing map information for calculation of routes, this function can also include independent navigational capabilities.

For example, map system 1310 can provide a map-based navigation system that stores a map of an operating environment including one or more objects. The map-based navigation system may be coupled to cameras and configured to determine a position of a vehicle by comparing stored objects to a visible environment, which may provide position data in the absence of global positioning system data or other positional information.

In this example, global positioning system receiver (GPS) 1312 is a physical system and can be a part of a global positioning system configured to determine a position of aircraft 1301. Global positioning system receiver (GPS) 1312 can include any currently used global positioning system hardware, including conventional, satellite-based systems as well as other systems using beacons, positional signals, and or other sources of positioning information.

As depicted, gyroscope 1316 is a physical device configured to detect rotation of aircraft 1301. Gyroscope 1316 can communicate with the other components in flight control system 1306 to control operation of aircraft 1301 and navigate aircraft 1301 along a flight path. Gyroscope 1316 can generate information that identifies an orientation of aircraft 1301.

In the illustrative example, accelerometer 1320 is a physical device configured to detect a linear motion of aircraft 1301. Accelerometer 1320 can include currently used accelerometers and can communicate with the other components in flight control system 1306 to control operation of aircraft 1301 and navigate aircraft 1301 along a flight path.

In this illustrative example, processor 1314 is a physical device and can be in communication with controller 1318, other components in flight control system 1306, steering mechanism 1304, payload 1302, and the other various other components, systems, and subsystems that may be present in aircraft 1301. Processor 1314 can be an internal processor in a data processing system such as in aircraft 1301 to support the various functions such as navigational functions or image processing functions. Processor 1314 can be configured to control operation of at least one of aircraft 1301, flight control system 1306, or payload 1302.

As depicted, processor 1314 can perform processing and calculation functions to support at least one of navigation, generating images, or tracking objects. In this illustrative example, object tracker 1208 can run in processor 1314. Processor 1314 may include a number of different processors cooperating to perform the steps described herein, such as where an internal processor in aircraft 1301 controls operation of aircraft 1301 while another processor assigned to payload 1302 controls at least one of tracking objects or illuminating objects with a laser beam.

In one illustrative example, processor 1314 can be configured to receive an image pair of the object from an imaging system and payload 1302 illuminated by a laser beam emitted from the laser projection system in payload 1302. Processor 1314 also can be configured to determine a bounding box for the object in the stereoscopic images and determine a region of interest in the stereoscopic images based on the bounding box for the object in the stereoscopic images. Processor 1314 can be configured to apply a mask based on the region of interest to the stereoscopic images and perform intensity averaging on the masked images to detect a set of pixels having a greatest intensity in the masked images. The set of pixels in the masked images is a set of common pixels in the masked images in which the set of common pixels is assumed to have a same location in both of the masked images. Processor 1314 can be configured to determine a three-dimensional position of the object using the set of common pixels.

As depicted, processor 1314 can be configured to predict a subsequent position of the object using the three-dimensional position of the object and a set of prior three-dimensional positions of the object. This subsequent position can be used to direct the laser beam to continue to illuminate the object being tracked.

Controller 1318 can operate to control components in aircraft 1301 such as flight control system 1306, payload 1302, movement system 1305, or steering mechanism 1304. Controller 1318 is in communication with processor 1314, aircraft 1301, flight control system 1306, payload 1302, steering mechanism 1304, and the other various components of the devices and systems described herein. Controller 1318 can also control the operation of payload 1302. This control can be in addition to or in place of the control described with respect to processor 1314.

As depicted, controller 1318 can include any hardware, software, or some combination thereof for controlling the various components in aircraft 1301 and the flight control system 1306 described herein, including, without limitation, microprocessors, microcontrollers, application-specific integrated circuits, programmable gate arrays, and any other digital and/or analog components, as well as combinations thereof, along with inputs and outputs for communicating control signals, drive signals, power signals, sensor signals, and other suitable types of signals.

Thus, processor 1314, controller 1318, and other components in flight control system 1306 in electronics 1300 can also provide information and control the operation of payload 1302. For example, these components can control payload 1302 to generate images and direct emission of a laser beam.

In this illustrative example, memory 1330 is a physical device and can include local memory or a remote storage device that stores a log of data for flight control system 1306, including, without limitation, images generated by payload 1302, orientations, speeds, flight paths, steering specifications, global positioning system coordinates, sensor readings, and other suitable information. The information stored in memory 1330 can be accessed by at least one of processor 1314 or controller 1318 in this example.

The illustrations of aircraft 1301 in FIG. 13 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 14:
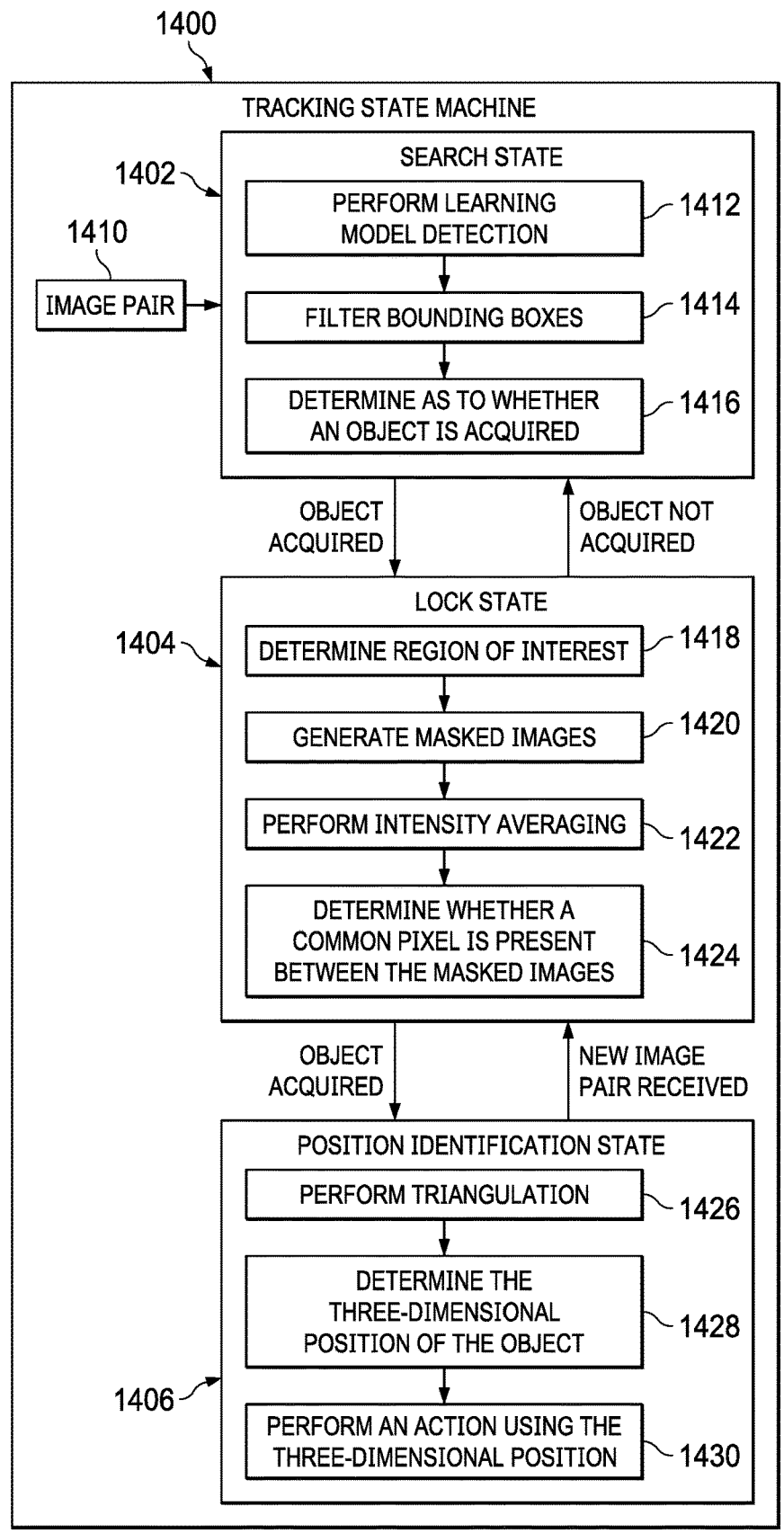
FIG. 14 is an illustration of a block diagram of a tracking state machine for an object tracker in accordance with an illustrative embodiment.

Turning next to FIG. 14, an illustration of a block diagram of a tracking state machine for an object tracker is depicted in accordance with an illustrative embodiment. In this illustrative example, tracking state machine 1400 is an example of a state machine that can be implemented in object tracker 1208 of FIG. 12.

Tracking state machine 1400 comprises search state 1402, lock state 1404, and position identification state 1406.

Search state 1402 can begin when image pair 1410 is received. Image pair 1410 is a pair of stereoscopic images, such as stereoscopic images 1214 of FIG. 12, in this example. Image pair 1410 includes a wide-angle image and a telephoto image. In search state 1402, tracking state machine 1400 performs learning model detection on image pair 1410 (operation 1412). Image pair 1410 is analyzed to detect the presence of an object in operation 1412. In this depicted example, the detection can be performed using a machine learning model such as a machine learning model in artificial intelligence system 1546 of FIG. 15. In the illustrative example, the machine learning model may employ a low rate detection algorithm such as a deep neural network.

The machine learning model can be trained to detect a set of object classes. An object class can be, for example, a drone, a micro aerial vehicle, a bird, a commercial airplane, or some other suitable type of object. The machine learning model performs a forward pass on each image in image pair 1410 to produce bounding box detections for one or more objects of interest that may be in each of the images.

When a single object is identifiably present in both images of image pair 1410, the result of the detection can be the generation of a bounding box that encompasses the object detected in both images of image pair 1410. As a result, a bounding box is generated for each image in image pair 1410. In operation 1412 in search state 1402, multiple bounding boxes can be generated for each image. When a single object is identifiably present in both images of image pair 1410, the result of the detection can be the generation of a bounding box that encompasses the object detected in both images of image pair 1410.

Tracking state machine 1400 filters bounding boxes (operation 1414). The filtering can be based on object class or on a desired confidence level for the presence of an object in a bounding box. The threshold for a confidence level can depend on a particular class of object. For example, a class for a drone may have one confidence level while a class for a bird has another confidence level. A class that combines both may require a higher confidence level in each of these classes alone. The filtering can also be based on the size of the bounding box.

Once the filtering is performed, a determination is made as to whether an object is acquired (operation 1416). In some illustrative examples, the object is an object to be tracked. An object is acquired if at least one bounding box remains in image pair 1410 after filtering.

When the object is acquired, tracking state machine 1400 shifts to lock state 1404. Otherwise, tracking state machine 1400 remains in search state 1402 and waits for another image pair to process to continue searching for an object.

In lock state 1404, tracking state machine 1400 determines a region of interest (operation 1418). When tracking state machine 1400 shifts from search state 1402 to lock state 1404, the region of interest is determined based on the bounding box determined for image pair 1410. Subsequently, tracking state machine 1400 shifts from position identification state 1406 back to lock state 1404 when a new image pair is received. When tracking state machine 1400 shifts from position identification state 1406 back to lock state 1404, the region of interest can be determined using a prior region of interest when tracking state machine 1400 shifts back to lock state 1404 from position identification state 1406.

In both cases, additional factors can be taken into account. For example, motion inputs such as motion inputs 1506 of FIG. 15 can be taken into account.

Tracking state machine 1400 generates masked images using the region of interest (operation 1420). In operation 1420, a masked image is generated for each image in image pair 1410. Portions of pixels in image pair 1410 outside of the region of interest can become black pixels such that these pixels cannot contribute to the intensity when intensity averaging is performed.

With the masked images, tracking state machine 1400 performs intensity averaging on the masked images (operation 1422). In operation 1422, tracking state machine 1400 determines a pixel with a largest weighted average intensity in each of the masked images. The location of the pixel is returned such that two locations are present in each of the two masked images. These two pixel locations represent common pixels between the masked images. The two pixels are common pixels for the same location on the object in the region of interest in the masked images.

The use of this high rate detection algorithm can be performed in an order of milliseconds. As the frame per second of imaging system increases, the probability that the object will remain in the region of interest increases.

A determination is made as to whether common pixels are present between the masked images processed using intensity averaging (operation 1424).

Tracking state machine 1400 shifts to position identification state 1406 when a common pixel is present between the masked images. The determination of whether a common pixel is present in the masked images can be determined in a number of ways. For example, a threshold for a minimum intensity can be used to classify the common pixel as not found when the intensity value is below the threshold.

When the common pixel is present, the object is considered to be acquired. Otherwise, the object is lost and no longer acquired with tracking state machine 1400 returning to search state 1402.

In position identification state 1406, tracking state machine 1400 performs triangulation using the common pixels (operation 1426). In operation 1426, the triangulation is performed using the common pixels detected in the masked images. Given the pixel location (u,v) in the image, a three-dimensional position of the object can be created in a camera coordinate frame (x,y,z). The position of the camera coordinate can be converted to a North East Down (NED) coordinate frame with the vehicle being at the origin of this NED coordinate frame. The object location can be converted to a global coordinate frame using known techniques.

Tracking state machine 1400 predicts the subsequent location of the object (operation 1428). In this illustrative example, the set location can be formed in a number of ways. For example, a Kalman filter can be used to predict at least one of a subsequent position, a future velocity, a trajectory, or some other characteristic of the object. In the illustrative example, equations of motion can be used to account for system latency via forward predictions. In other illustrative examples, other techniques in addition to or in place of the Kalman filter can be used. These techniques can include at least one of a particle filter, a two-dimensional interpolation, a linear interpolation, or some other suitable technique.

Predicting the subsequent location of the object as well as other information can allow for extending detections and increasing throughput of the process. In other words, when returning the search state 1402 is not needed, the processing speed in tracking an object can be increased.

When the prediction results in the object are not being found in a region of interest, the process can shift back to search state 1402.

The tracking state machine 1400 performs an action using the three-dimensional position of the object (operation 1430). For example, tracking state machine 1400 can control a mirror to direct a laser beam to illuminate the object. The mirror can be controlled to continue to point the laser beam at the object.

In the illustrative example, tracking state machine 1400 shifts back to lock state 1404 when a new image pair is received. In this case, the region of interest determined in operation 1418 using the region of interest previously determined for the prior image pair.

Thus, tracking state machine 1400 can process image pairs more quickly without returning to search state 1402 to detect an object in the image and generate a bounding box.

In the illustrative example, although the states are shown as being performed sequentially, this illustration is not meant to limit the manner in which tracking state machine 1400 can be implemented or operate. For example, position identification state 1406 can run in parallel to search state 1402 and lock state 1404 in other illustrative examples.

With reference now to FIG. 15, an illustration of a block diagram of a tracking environment is depicted in accordance with an illustrative embodiment. In view 1500 of tracking environment 1200, tracking environment 700 of FIG. 7 is an example of one implementation for tracking environment 1200. In some illustrative examples, tracking environment 1200 in FIG. 15 provides additional details regarding operations performed by object tracker 1208 in computer system 1206.

As depicted, object tracker 1208 is configured to perform a number of different operations in tracking object 1202. Object tracker 1208 determines bounding box 1502 for object 1202 in stereoscopic images 1214.

As depicted, object tracker 1208 determines region of interest 1504 in stereoscopic images 1214 based on bounding box 1502 for object 1202 in stereoscopic images 1214. In the illustrative example, region of interest 1504 be determined by also using motion inputs 1506. Motion inputs 1506 can take a number of different forms. For example, motion inputs 1506 can be at least one of a motion of platform 1212, a predicted movement of object 1202, global positioning system data for platform 1212, altitude data for platform 1212, movement characteristics of platform 1212, and other suitable information. Movement characteristics can include limitations on the movement of platform 1212. For example, a bank radius, a turn angle, or other movement characteristic of an aircraft can be a motion input when platform 1212 is an aircraft.

Region of interest 1504 is a portion of stereoscopic images 1214. In this illustrative example, region of interest 1504 is the portion of stereoscopic images 1214 that is of interest for further analysis.

In this illustrative example, region of interest 1504 can be selected to include bounding box 1502, be located in bounding box 1502, overlap a portion of bounding box 1502, or be selected to have some other relationship with respect to bounding box 1502. When region of interest 1504 includes bounding box 1502, region of interest 1504 can have a same size and position as bounding box 1502.

As depicted, object tracker 1208 applies mask 1508 based on region of interest 1504 to stereoscopic images 1214. In this illustrative example, mask 1508 masks out portions of stereoscopic images 1214 outside of region of interest 1504 to form masked images 1510. In other words, mask 1508 can function as a filter to only pass pixels within region of interest 1504. The other portions can be all black, white, or some other suitable uniform color.

In the illustrative example, object tracker 1208 can perform intensity averaging 1512 on masked images 1510 to detect a set of pixels 1514 having greatest intensity 1516 in masked images 1510. Intensity averaging 1512 can take a number of different forms. For example, intensity averaging 1512 can be selected from at least one of a weighted intensity averaging, a maximum pixel value, a sliding window average, or other intensity averaging techniques. For example, intensity averaging 1512 can be performed to find a weighted average intensity instead of a maximum intensity. For example, weighted average intensities can be identified for both images.

In other illustrative examples, intensity averaging 1512 can be performed in a manner to improve detection accuracy instead of finding the maximum intensity pixel. Processes that have a rate that is sufficient to process images in real time.

In illustrative examples, intensity averaging 1512 can be performed on different types of images. For example, intensity averaging 1512 can be performed on at least one of a grayscale image or color image.

In some illustrative examples, intensity averaging 1512 can be performed when a directed light source, such as a laser beam, illuminates object 1202 when image pair 1216 is generated by stereoscopic imaging system 1210. The use of a directed light source to illuminate object 1202 can increase the likelihood that the set of maximum pixel values are located on object 1202.

The set of pixels 1514 in masked images 1510 are a set of common pixels 1518 in masked images 1510 in which the set of common pixels 1518 is assumed to have same location 1520 in both of masked images 1510. The set of common pixels 1518 is one or more common pixels between masked images 1510. In the illustrative example, same location 1520 is the same location on object 1202. For example, same location 1520 can be pixels representing a feature on object 1202. The feature can be, for example, a wheel, a fairing, a bolt, or some other suitable feature of object 1202 that is present in masked images 1510. Object tracker 1208 determines three-dimensional position 1522 of object 1202 using the set of common pixels 1518. In some illustrative examples, three-dimensional position 1522 is the same as three-dimensional position 1254 of FIG. 12.

In the illustrative example, three-dimensional position 1522 can be a location of object 1202 in a three-dimensional space and can include an orientation of the object 1202. Three-dimensional position 1522 can be described using three-dimensional coordinates for a three-dimensional coordinate system. The three-dimensional coordinate system can be, for example, a Cartesian coordinate system, a spherical coordinate system, or some other suitable type of coordinate system that can describe locations in a three-dimensional space.

Further, three-dimensional position 1522 can also include an orientation of object 1202. In other words, this position can also include a direction in which object 1202 is pointing.

Three-dimensional position 1522 determined by object tracker 1208 can be initially a position in camera coordinate frame 1524. Three-dimensional position 1522 can be determined by performing triangulation on the set of common pixels 1518 in masked images 1510. In this illustrative example, the triangulation can be performed using the positions of the two cameras in stereoscopic imaging system 1210 and the set of common pixels 1518.

Object tracker 1208 can convert the position of object 1202 from camera coordinate frame 1524 to global coordinate frame 1256 to obtain three-dimensional position 1522 of object 1202. In other illustrative examples, the conversion can be to other coordinate frames other than global coordinate frame 1256. Another coordinate frame can be an inertial local coordinate frame with the center of gravity of the platform 1212 being the origin of the coordinate frame.

In the illustrative example, a coordinate frame is a coordinate system for a frame of reference. For example, camera coordinate frame 1524 describes the position of objects using stereoscopic imaging system 1210 as the frame of reference.

With three-dimensional position 1522, object tracker 1208 can also predict subsequent three-dimensional position 1528 of object 1202 using three-dimensional position 1522 of object 1202 and a set of prior three-dimensional positions 1530 of object 1202. Further, object tracker 1208 can predict subsequent three-dimensional position 1528 and trajectory 1532 of object 1202 using three-dimensional position 1522 of object 1202 and the set of prior three-dimensional positions 1530 of object 1202. In the illustrative example, trajectory 1532 is a path for movement of object 1202. The path is one that object 1202 follows through space as a function of time.

Subsequent three-dimensional position 1528 of object 1202 can be predicted in a number of different ways. For example, the prediction can be performed by using at least one of a Kalman filter, a particle filter, two-dimensional interpolation, linear interpolation, or some other suitable known process for predicting subsequent three-dimensional positions of an object.

In this illustrative example, object tracker 1208 can perform a set of actions 1534 with predicting subsequent three-dimensional position 1528 of object 1202. For example, object tracker 1208 can direct a light source to illuminate object 1202 using predicted subsequent three-dimensional position 1542 of object 1202. The set of actions 1534 can also include at least one of object following, collision avoidance, coordinated movement with object 1202, object intercept, object capture, other object engagements, or other suitable actions.

Object tracker 1208 can continue to receive image pairs from stereoscopic imaging system 1210. For example, object tracker 1208 can receive subsequent image pair 1536. In this example, subsequent image pair 1536 comprises subsequent stereoscopic images 1538 generated by stereoscopic imaging system 1210.

As depicted, object tracker 1208 can determine region of interest 1504 in subsequent stereoscopic images 1538 based on prior region of interest 1540 and predicted subsequent three-dimensional position 1542 of object 1202 in subsequent stereoscopic images 1538.

Object tracker 1208 can apply mask 1508 based on region of interest 1504 to subsequent stereoscopic images 1538. As depicted, mask 1508 masks out the portions of subsequent stereoscopic images 1538 outside of region of interest 1504 to form subsequent masked images 1544.

In this illustrative example, object tracker 1208 can perform intensity averaging 1512 on subsequent masked images 1544 to detect the set of pixels 1514 having greatest intensity 1516 in subsequent masked images 1544. The set of pixels 1514 in subsequent masked images 1544 are the set of common pixels 1518 in subsequent masked images 1544 that are assumed to have same location 1520. Object tracker 1208 can determine three-dimensional position 1522 of object 1202 using the set of common pixels 1518 identified in subsequent masked images 1544. As a result, object tracker 1208 can continue to detect the current position of object 1202 as additional image pairs are received from stereoscopic imaging system 1210.

In this illustrative example, object tracker 1208 can perform one or more operations using artificial intelligence system 1546. As depicted, artificial intelligence system 1546 is a system that has intelligent behavior and can be based on the function of a human brain. An artificial intelligence system comprises at least one of an artificial neural network, a deep neural network, a cognitive system, a Bayesian network, a fuzzy logic, an expert system, a natural language system, or some other suitable system. Machine learning is used to train the artificial intelligence system. Machine learning involves inputting data to the process and allowing the process to adjust and improve the function of the artificial intelligence system.

Artificial intelligence system 1546 can include machine learning models implemented using one or more architectures such as a deep neural network or other suitable architectures. A machine learning model is a type of artificial intelligence model that can learn without being explicitly programmed.

A machine learning model can learn based on data input into the machine learning model. The machine learning model can learn using various types of machine learning algorithms. The machine learning algorithms include at least one of a supervised learning, an unsupervised learning, a feature learning, a sparse dictionary learning, an anomaly detection, association rules, or other types of learning algorithms. Examples of machine learning models include an artificial neural network, a decision tree, a support vector machine, a Bayesian network, a genetic algorithm, and other types of models. These machine learning models can be trained using data and process additional data to provide a desired output. The machine learning models can be pre-trained with a representative collected dataset or trained in an online fashion using new input data.

In one illustrative example, one or more technical solutions are present that overcome a technical problem with tracking objects with a desired level of accuracy and as quickly as desired to track an object in real-time. As a result, one or more technical solutions can provide a technical effect of increasing the speed at which an object can be tracked using stereoscopic images. Further, in one or more illustrative examples, a technical solution is present in which false positives from triangulation is reduced. Further, the one or more illustrative examples provide a technical solution in which triangulation can be performed at a rate that provides for real-time tracking of objects.

Computer system 1206 can be configured to perform at least one of the steps, operations, or actions described in the different illustrative examples using software, hardware, firmware, or a combination thereof. As a result, computer system 1206 operates as a special purpose computer system in which object tracker 1208 in computer system 1206 enables tracking an object using stereoscopic images in a manner that reduces a use of computer resources in detecting the object in the image and generates a bounding box. In particular, object tracker 1208 in computer system 1206 transforms computer system 1206 into a special purpose computer system as compared to currently available general computer systems that do not have object tracker 1208.

Figure 16:
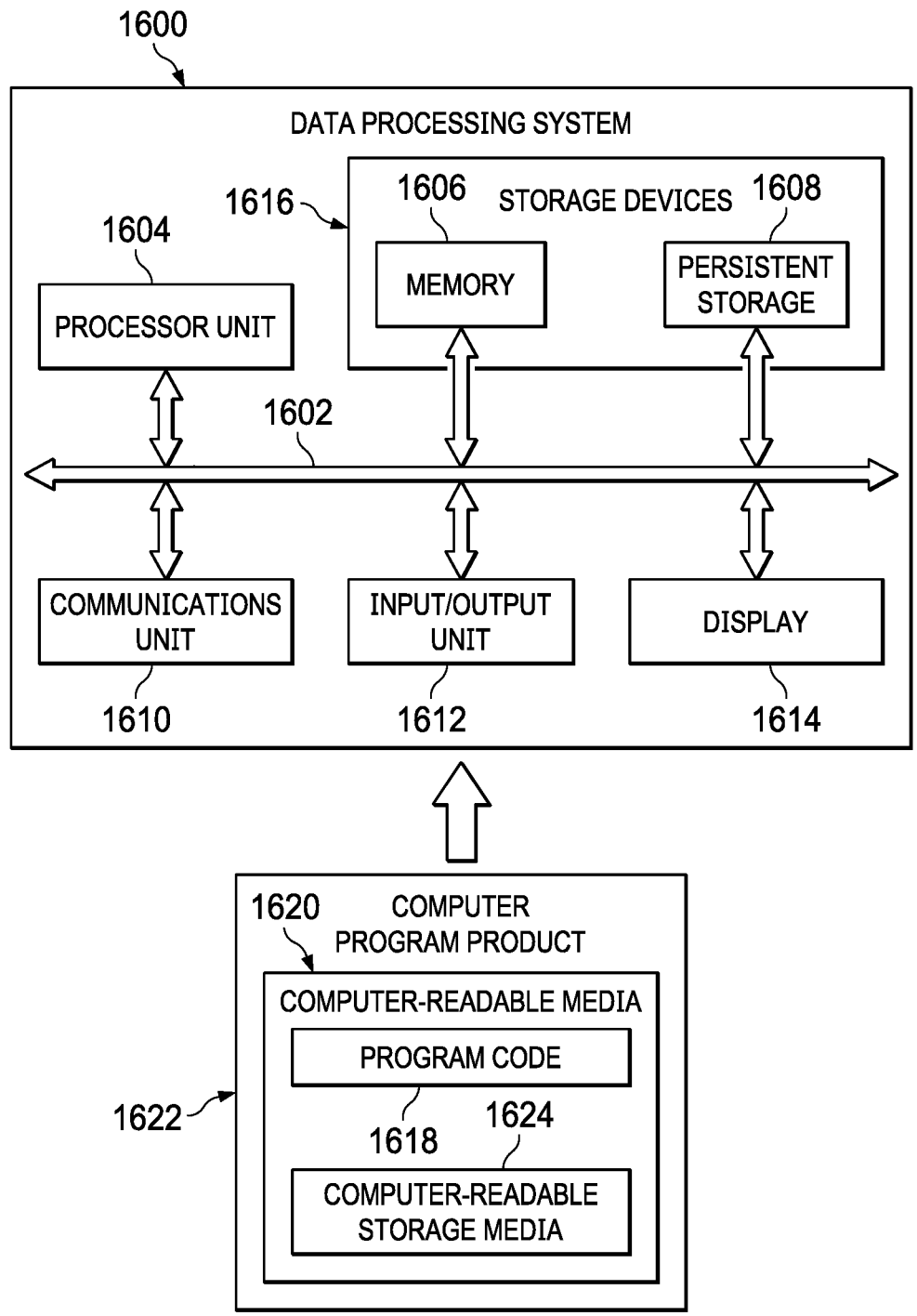
FIG. 16 is an illustration of a block diagram of a data processing system in accordance with an illustrative embodiment.

Turning now to FIG. 16, an illustration of a block diagram of a data processing system is depicted in accordance with an illustrative embodiment. Data processing system 1600 can be used to implement computer system 1206 of FIG. 12. Data processing system 1600 can be used to perform at least one of flowchart 600, process 800, process 900, process 1000, and process 1100. In this illustrative example, data processing system 1600 includes communications framework 1602, which provides communications between processor unit 1604, memory 1606, persistent storage 1608, communications unit 1610, input/output (I/O) unit 1612, and display 1614. In this example, communications framework 1602 takes the form of a bus system.

Processor unit 1604 serves to execute instructions for software that can be loaded into memory 1606. Processor unit 1604 includes one or more processors. For example, processor unit 1604 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1604 can may be implemented using one or more heterogeneous processor systems in which a main processor is present with secondary processors on a single chip. As another illustrative example, processor unit 1604 can be a symmetric multi-processor system containing multiple processors of the same type on a single chip.

Memory 1606 and persistent storage 1608 are examples of storage devices 1616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1616 may also be referred to as computer-readable storage devices in these illustrative examples. Memory 1606, in these examples, can be, for example, a random-access memory or any other suitable volatile or non-volatile storage device. Persistent storage 1608 can take various forms, depending on the particular implementation.

For example, persistent storage 1608 may contain one or more components or devices. For example, persistent storage 1608 can be a hard drive, a solid-state drive (SSD), a flash memory, a rewritable optical disk, a rewritable magnetic tape, or some combination of the above. The media used by persistent storage 1608 also can be removable. For example, a removable hard drive can be used for persistent storage 1608.

Communications unit 1610, in these illustrative examples, provides for communications with other data processing systems or devices. In these illustrative examples, communications unit 1610 is a network interface card.

Input/output unit 1612 allows for input and output of data with other devices that can be connected to data processing system 1600. For example, input/output unit 1612 can provide a connection for user input through at least one of a keyboard, a mouse, or some other suitable input device. Further, input/output unit 1612 can send output to a printer. Display 1614 provides a mechanism to display information to a user.

Instructions for at least one of the operating system, applications, or programs can be located in storage devices 1616, which are in communication with processor unit 1604 through communications framework 1602. The processes of the different embodiments can be performed by processor unit 1604 using computer-implemented instructions, which can be located in a memory, such as memory 1606.

These instructions are referred to as program code, computer usable program code, or computer-readable program code that can be read and executed by a processor in processor unit 1604. The program code in the different embodiments can be embodied on different physical or computer-readable storage medium, such as memory 1606 or persistent storage 1608.

Program code 1618 is located in a functional form on computer-readable media 1620 that is selectively removable and can be loaded onto or transferred to data processing system 1600 for execution by processor unit 1604. Program code 1618 and computer-readable media 1620 form computer program product 1622 in these illustrative examples. In the illustrative example, computer-readable medium 1620 is computer-readable storage media 1624.

In these illustrative examples, computer-readable storage medium 1624 is a physical or tangible storage device used to store program code 1618 rather than a medium that propagates or transmits program code 1618. Computer readable storage medium 1624, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1618 can be transferred to data processing system 1600 using a computer-readable signal media. The computer-readable signal media can be, for example, a propagated data signal containing program code 1618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1620" can be singular or plural. For example, program code 1618 can be located in computer-readable media 1620 in the form of a single storage device or system. In another example, program code 1618 can be located in computer-readable media 1620 that is distributed in multiple data processing systems. In other words, some instructions in program code 1618 can be located in one data processing system while other instructions in program code 1618 can be located in one data processing system. For example, a portion of program code 1618 can be located in computer-readable media 1620 in a server computer while another portion of program code 1618 can be located in computer-readable media 1620 located in a set of client computers.

The different components illustrated for data processing system 1600 are not meant to provide architectural limitations to the manner in which different embodiments can be implemented. In some illustrative examples, one or more of the components may be incorporated in or otherwise form a portion of, another component. For example, memory 1606, or portions thereof, can be incorporated in processor unit 1604 in some illustrative examples. The different illustrative embodiments can be implemented in a data processing system including components in addition to or in place of those illustrated for data processing system 1600. Other components shown in FIG. 16 can be varied from the illustrative examples shown. The different embodiments can be implemented using any hardware device or system capable of running program code 1618.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Thus, one or more of the illustrative examples provide a method, apparatus, system, and computer program product for tracking objects. In one illustrative example, a stereo camera assembly comprises cameras having two distinct lenses—a wide-angle lens camera having a wide-angle lens and a telephoto lens camera having a telephoto lens. The stereo camera assembly further comprises an image processing logic to overlap the images taken from two cameras having two types of lenses for detecting the object. The image processing logic is performed during a transformation of the wide-angle image and the telephoto image by a computer system of the stereo camera assembly. The use of two distinct types of lenses enlarges the area of monitoring. The use of two distinct types of lenses provides the ability to maneuver stereo camera assembly to place stereo camera assembly in a position to perform object tracking.

In one illustrative example, a method tracks an object. The image pair comprises stereoscopic images generated by a stereoscopic imaging system. A bounding box is determined for the object in the stereoscopic images. A region of interest in the stereoscopic images is determined based on the bounding box for the object in the stereoscopic images. A mask is applied based on the region of interest to the stereoscopic images. The mask masks out portions of the stereoscopic images outside of the region of interest to form masked images. Intensity averaging is performed on the masked images to detect a set of pixels having a greatest intensity in the masked images. The set of pixels in the masked images is a set of common pixels in the masked images in which the set of common pixels is assumed to have a same location in both of the masked images. A three-dimensional position of the object is determined using the set of common pixels.

One illustrative example provides an improved ability to track an object. For example, the illustrative example enables real-time tracking of objects. The tracking capability in the illustrative example can be used to perform various actions including but not limited to detection and avoidance of other objects. For example, an illustrative example can be used in a commercial airplane to avoid collisions with other objects in the same airspace as the commercial airplane. In another illustrative example, tracking of the object can be used to follow or perform surveillance of the object. In yet another illustrative example, tracking can be used to coordinate the flight of the swarm of unmanned aerial vehicles.

Further, the disclosure comprises embodiments according to the following clauses:

Clause 1: A stereo camera assembly comprising:
  a wide-angle lens camera mounted on a mounting structure; and
  a telephoto lens camera mounted on the mounting structure such that a field of view of the telephoto lens camera is at least partially encompassed by a field of view of the wide-angle lens camera.

Clause 2: The stereo camera assembly of clause 1 further comprising:
  the mounting structure, wherein the mounting structure is configured to be connected to a vehicle.

Clause 3: The stereo camera assembly of clause 1 or clause 2 wherein the wide-angle lens camera and the telephoto lens camera are mounted at a same height of the mounting structure.

Clause 4: The stereo camera assembly of any of clauses 1-3 wherein the wide-angle lens camera and the telephoto lens camera are mounted at a same angle relative to the mounting structure.

Clause 5: The stereo camera assembly of any of clauses 1-4 further comprising:
  a computer system configured to receive a wide-angle image from the wide-angle lens camera, receive a telephoto image from the telephoto lens camera, determine whether an object is identifiably present in the wide-angle image, determine whether the object is identifiably present in the telephoto image, and send commands to a movement system in response to determining the object is identifiably present in only one of the telephoto image or the wide-angle image, wherein the commands are configured to maneuver the wide-angle lens camera and the telephoto lens camera towards the object.

Clause 6: The stereo camera assembly of any of clauses 1-4 further comprising:
  a computer system configured to receive a wide-angle image from the wide-angle lens camera, receive a telephoto image from the telephoto lens camera, and perform a transformation on the wide-angle image and the telephoto image to map the telephoto image to the wide-angle image.

Clause 7: The stereo camera assembly of clause 6, wherein the computer system is further configured to identify an object in one of the telephoto image or the wide-angle image, and determine whether the object is identifiably present in the other of the telephoto image or the wide-angle image.

Clause 8: The stereo camera assembly of clause 7, wherein the computer system is further configured to move the wide-angle lens camera and the telephoto lens camera relative to the object in response to determining the object is not identifiably present in the other of the telephoto image or the wide-angle image.

Clause 9: The stereo camera assembly of clause 7 or clause 8, wherein the computer system is further configured to determine a three-dimensional location of the object using the telephoto image and the wide-angle image in response to determining the object is identifiably present in both of the telephoto image and the wide-angle image.

Clause 10: A method of operating an object tracking system comprising:
  receiving, by a computer system, a wide-angle image and a telephoto image, wherein the wide-angle image is provided by a wide-angle lens camera of a stereo camera assembly and the telephoto image is provided by a telephoto lens camera of the stereo camera assembly, wherein the telephoto lens camera is mounted on a mounting structure such that a field of view of the telephoto lens camera is at least partially encompassed by a field of view of the wide-angle lens camera; and
  performing, by the computer system, a transformation on the wide-angle image and the telephoto image to map the telephoto image to the wide-angle image.

Clause 11: The method of clause 10 further comprising:
  identifying an object in one of the telephoto image or the wide-angle image; and
  determining if the object is identifiably present in the other of the telephoto image or the wide-angle image.

Clause 12: The method of clause 11, wherein identifying the object in one of the telephoto image or the wide-angle image comprises identifying the object in the telephoto image, the method further comprising:
  moving, in response to determining the object is not identifiably present in the wide-angle image, the wide-angle lens camera and telephoto lens camera towards the object.

Clause 13: The method of clause 11 or clause 12, wherein identifying the object in one of the telephoto image or the wide-angle image comprises identifying the object in the wide-angle image, the method further comprising:
  rotating, in response to determining the object is not identifiably present in the telephoto image, the stereo camera assembly towards the object.

Clause 14: The method of any of clauses 11-13, wherein identifying the object in one of the telephoto image or the wide-angle image comprises identifying the object in the telephoto image, wherein the object is determined to be identifiably present in the wide-angle image, the method further comprising:
  determining, in response to determining the object is identifiably present in the wide-angle image, a three-dimensional location of the object using both the telephoto image and the wide-angle image.

Clause 15: The method of any of clauses 10-14 further comprising:
  taking a second wide-angle image using the wide-angle lens camera of the stereo camera assembly and a second telephoto image using the telephoto lens camera of the stereo camera assembly;
  receiving, by the computer system, the second wide-angle image and the second telephoto image; and
  tracking the object using the second telephoto image, the second wide-angle image, and the three-dimensional location of the object determined using the telephoto image and the wide-angle image.

Clause 16: The method of clause 15, wherein the telephoto image and the wide-angle image are an image pair, the method further comprising:
  determining a region of interest in the image pair based on a bounding box determined for the object in the image pair;
  applying a mask based on the region of interest to the image pair, wherein the mask masks out portions of the image pair outside of the region of interest to form masked images;
  performing intensity averaging on the masked images to detect a set of pixels having a greatest intensity in the masked images, wherein the set of pixels in the masked images is a set of common pixels in the masked images in which the set of common pixels is assumed to have a same location in both of the masked images; and
  determining the three-dimensional position of the object using the set of common pixels.

Clause 17: The method of clause 16 further comprising:
  determining the bounding box for the object in the image pair.

Clause 18: The method of clause 16 further comprising:
  predicting a subsequent three-dimensional position of the object using the three-dimensional position of the object and a set of prior three-dimensional positions of the object.

Clause 19: The method of clause 18, wherein predicting the subsequent three-dimensional position of the object using the three-dimensional position of the object and the set of prior three-dimensional positions of the object comprises:
  predicting the subsequent three-dimensional position and a trajectory of the object using the three-dimensional position of the object and the set of prior three-dimensional positions of the object.

Clause 20: The method of clause 18, wherein the image pair is a first image pair and further comprising:
  receiving a subsequent image pair;
  determining the region of interest in the subsequent image pair based on a prior region of interest and a predicted subsequent three-dimensional position of the object in the subsequent image pair;

applying the mask based on the region of interest to the subsequent image pair, wherein the mask masks out the portions of the subsequent image pair outside of the region of interest to form subsequent masked images;

performing intensity averaging on the subsequent masked images to detect the set of pixels having the greatest intensity in the subsequent masked images, wherein the set of pixels in the subsequent masked images is the set of common pixels in the subsequent masked images that is assumed to have the same location; and determining the three-dimensional position of the object using the set of common pixels identified in the subsequent masked images.

Clause 21: The method of clause 18 further comprising:
illuminating the object with a laser beam such that the object is illuminated by the laser beam in the image pair; and
directing the laser beam to continue to illuminate the object with the laser beam using the predicted subsequent three-dimensional position of the object.

Clause 22: The method of clause 16, wherein determining the three-dimensional position of the object using the set of common pixels comprises:
determining a position of the object in a camera coordinate frame using a triangulation performed on the set of common pixels in the masked images; and
converting the position of the object from the camera coordinate frame to a global coordinate frame to obtain the three-dimensional position of the object.

Clause 23: The method of clause 16, wherein determining the region of interest in the image pair based on the bounding box for the object in the image pair comprises:
identifying motion inputs; and
determining the region of interest in the image pair based on the bounding box for the object in the image pair and the motion inputs.

Clause 24: The method of clause 16, wherein the intensity averaging is selected from at least one of a weighted intensity averaging, a maximum pixel value, or a sliding window average.

Clause 25: The method of clause 16, wherein the region of interest is selected to include the bounding box, be located in the bounding box, or overlap a portion of the bounding box.

Clause 26: The method of clause 16, wherein the three-dimensional position of the object comprises a location of the object in three-dimensional space and an orientation of the object.

Clause 27: An object tracking system comprising:
a wide-angle lens camera mounted on a mounting structure;
a telephoto lens camera mounted on the mounting structure such that a field of view of the telephoto lens camera is at least partially encompassed by a field of view of the wide-angle lens camera;
a computer system configured to receive a wide-angle image from the wide-angle lens camera, receive a telephoto image from the telephoto lens camera, determine whether an object is identifiably present within the wide-angle image, determine whether the object is identifiably present within the telephoto image, generate commands to move the mounting structure in response to determining the object is identifiably present in only one of the telephoto image or the wide-angle image; and
a movement system configured to move the mounting structure in response to receiving commands from the computer system.

Clause 28: The object tracking system of clause 27 further comprising:
a vehicle, wherein the mounting structure is mounted to a vehicle, and wherein the movement system is a movement system of a vehicle.

Clause 29: The object tracking system of clause 27 or clause 28, wherein the computer system is further configured to determine a three-dimensional location of the object using the telephoto image and the wide-angle image in response to determining the object is identifiably present in both of the telephoto image and the wide-angle image.

Clause 30: The object tracking system of any of clauses 27-29, wherein the commands to move the mounting structure are commands to rotate the mounting structure towards the object in response to determining the object is identifiably present in the wide-angle image and not identifiably present in the telephoto image.

Clause 31: The object tracking system of any of clauses 27-30, wherein both the wide-angle lens camera and the telephoto lens camera are mounted on the mounting structure perpendicular to the mounting structure.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A stereo camera assembly that comprises:
a wide-angle lens camera mounted on a mounting structure and configured to take a first wide-angle image and a second wide-angle image;
a telephoto lens camera mounted on the mounting structure such that a field of view of the telephoto lens camera is at least partially encompassed by a field of view of the wide-angle lens camera and configured to take a first telephoto image and a second telephoto image; and
a computer system configured to:
receive the first wide-angle image
receive the second wide-angle image;
receive the first telephoto image
receive the second wide-angle image;
perform a transformation on the first wide-angle image and the first telephoto image to map the first telephoto image to the first wide-angle image;
move the mounting structure based upon the map of the first telephoto image to the first wide-angle image;
determine a three-dimensional location of an object based upon the first telephoto image and the first wide-angle image; and
track the object based upon the second telephoto image, the second wide-angle image, and the three-dimensional location of the object.

2. The stereo camera assembly of claim 1, wherein the mounting structure is configured to be connected to a vehicle.

3. The stereo camera assembly of claim 1, wherein the computer system is further configured to determine whether the object is identifiably present in the first wide-angle image, determine whether the object is identifiably present in the first telephoto image, and send commands to a movement system in response to a determination that the object is identifiably present in only one of the first telephoto image or the first wide-angle image, wherein the commands are configured to maneuver the wide-angle lens camera and the telephoto lens camera towards the object.

4. The stereo camera assembly of claim 1, wherein the wide-angle lens camera and the telephoto lens camera are mounted at a same height of the mounting structure.

5. The stereo camera assembly of claim 1, wherein the wide-angle lens camera and the telephoto lens camera are mounted at a same angle relative to the mounting structure.

6. The stereo camera assembly of claim 1, wherein the computer system is further configured to identify the object in one of the first telephoto image or the first wide-angle image, and determine whether the object is identifiably present in the other of the first telephoto image or the first wide-angle image.

7. The stereo camera assembly of claim 6, wherein the computer system is further configured to move the wide-angle lens camera and the telephoto lens camera relative to the object in response to a determination that the object is not identifiably present in the other of the first telephoto image or the first wide-angle image.

8. The stereo camera assembly of claim 6, wherein the three-dimensional location is based upon a determination that-the object is identifiably present in both of the first telephoto image and the first wide-angle image.

9. A method of operating an object tracking system, the method comprising:
producing, by a wide-angle lens camera of a stereo camera assembly, a first wide-angle image and a second wide-angle image;
producing, by a telephoto lens camera of the stereo camera assembly, a first telephoto image and a second telephoto image, wherein the telephoto lens camera is mounted on a mounting structure such that a field of view of the telephoto lens camera is at least partially encompassed by a field of view of the wide-angle lens camera;
receiving, by a computer system, the first wide-angle image, the second wide-angle image, the first telephoto image, and the second telephoto image;
performing, by the computer system, a transformation on the first wide-angle image and the first telephoto image to map the first telephoto image to the first wide-angle image;
moving, by the computer system, the mounting structure in response to mapping the first telephoto image to the first wide-angle image
determining, by the computer system, a three-dimensional location of an object using the first telephoto image and the first wide-angle image; and
tracking, by the computer system, the object based upon the second telephoto image, the second wide-angle image, and the three-dimensional location of the object.

10. The method of claim 9 further comprising:
identifying the object in one of the first telephoto image or the first wide-angle image; and
determining if the object is identifiably present in the other of the first telephoto image or the first wide-angle image.

11. The method of claim 10, further comprising:
identifying the object in the first telephoto image; and
moving, in response to determining the object is not identifiably present in the first wide-angle image, the wide-angle lens camera and the telephoto lens camera towards the object.

12. The method of claim 10, further comprising:
identifying the object in the first wide-angle image; and
rotating, in response to determining the object is not identifiably present in the first telephoto image, the stereo camera assembly towards the object.

13. The method of claim 10, the method further comprising:
identifying the object in the first telephoto image and in the first wide-angle image; and
determining, in response to determining the object is identifiably present in the first wide-angle image, the three-dimensional location of the object using both the first telephoto image and the first wide-angle image.

14. The method of claim 10, wherein the first telephoto image and the first wide-angle image are an image pair, the method further comprising:
determining a region of interest in the image pair based on a bounding box determined for the object in the image pair;
applying a mask based on the region of interest to the image pair, wherein the mask masks out portions of the image pair outside of the region of interest to form masked images;
performing intensity averaging on masked images to detect a set of pixels having a greatest intensity in the masked images, wherein the set of pixels in the masked images is a set of common pixels in the masked images in which the set of common pixels is assumed to have a same location in both of the masked images; and
determining the three-dimensional location position of the object using the set of common pixels.

15. An object tracking system that comprises:
a wide-angle lens camera mounted on a mounting structure and configured to produce a first wide-angle image and a second wide-angle image;
a telephoto lens camera mounted on the mounting structure such that a field of view of the telephoto lens camera is at least partially encompassed by a field of view of the wide-angle lens camera and configured to produce a first telephoto image and a second telephoto image;
a computer system configured to:
receive: the first wide-angle image, the second wide-angle image, the first telephoto image, and the second telephoto image;
determine whether an object is identifiably present within the first wide-angle image;
determine whether the object is identifiably present within the first telephoto image;
generate commands to move the mounting structure based upon a determination that the object is identifiably present in only one of the first telephoto image or the first wide-angle image;
perform a transformation on the first wide-angle image and the first telephoto image to map the first telephoto image to the first wide-angle image;
determine a three-dimensional location of an object based upon the first telephoto image and the first wide-angle image; and track the object based upon the second telephoto image, the second wide-angle image, and the three-dimensional location of the object; and
a movement system configured to move the mounting structure based upon commands from the computer system.

16. The object tracking system of claim 15, further comprising:
a vehicle, wherein the mounting structure is mounted to the vehicle, and wherein the movement system is a movement system of the vehicle.

17. The object tracking system of claim 15, wherein the computer system is further configured to determine a three-dimensional location of the object based upon the first telephoto image, the first wide-angle image, and a determination that the object is identifiably present in both of the first telephoto image and the first wide-angle image.

18. The object tracking system of claim 15, wherein the commands to move the mounting structure are commands to rotate the mounting structure towards the object based upon a determination that the object is identifiably present in the first wide-angle image and not identifiably present in the first telephoto image.

19. The object tracking system of claim 15, wherein both the wide-angle lens camera and the telephoto lens camera are mounted on the mounting structure perpendicular to the mounting structure.

20. The stereo camera assembly of claim 8, wherein the first telephoto image and the first wide-angle image are an image pair, and the stereo camera assembly further comprises the computer system configured to:
determine a region of interest in the image pair based on a bounding box determined for the object in the image pair;
apply a mask based on the region of interest to the image pair, wherein the mask masks out portions of the image pair outside of the region of interest to form masked images;
perform intensity averaging on masked images to detect a set of pixels having a greatest intensity in the masked images, wherein the set of pixels in the masked images is a set of common pixels in the masked images in which the set of common pixels is assumed to have a same location in both of the masked images; and
determine the three-dimensional location position of the object using the set of common pixels.

21. The object tracking system of claim 15, wherein the first telephoto image and the first wide-angle image are an image pair and the computer system is further configured to:
determine a region of interest in the image pair based on a bounding box determined for the object in the image pair;
apply a mask based on the region of interest to the image pair, wherein the mask masks out portions of the image pair outside of the region of interest to form masked images;
perform intensity averaging on masked images to detect a set of pixels having a greatest intensity in the masked images, wherein the set of pixels in the masked images is a set of common pixels in the masked images in which the set of common pixels is assumed to have a same location in both of the masked images; and
determine the three-dimensional location position of the object using the set of common pixels.

\* \* \* \* \*

UNITED STATES PATENT AND TRADEMARK OFFICE
CERTIFICATE OF CORRECTION

| | | |
|---|---|---|
| PATENT NO. | : 11,865,978 B2 | Page 1 of 1 |
| APPLICATION NO. | : 17/454446 | |
| DATED | : January 9, 2024 | |
| INVENTOR(S) | : Andrew Mark Heafitz and Igor Janjic | |

It is certified that error appears in the above-identified patent and that said Letters Patent is hereby corrected as shown below:

In the Claims

Column 40, Line 37, correct "determining the three-dimensional location position of the" to read -- determining the three-dimensional location of the --, Column 42, Line 11, correct "determine the three-dimensional location position of the" to read -- determine the three-dimensional location of the --.

Signed and Sealed this
Twenty-sixth Day of March, 2024

Katherine Kelly Vidal
*Director of the United States Patent and Trademark Office*